US012811473B2

(12) United States Patent
Rümmler et al.

(10) Patent No.: US 12,811,473 B2
(45) Date of Patent: Nov. 24, 2026

(54) ELECTRIC MOTOR OF AN ANCILLARY UNIT OF A MOTOR VEHICLE

(71) Applicant: Brose Fahrzeugteile SE & Co. Kommanditgesellschaft, Würzburg, Würzburg (DE)

(72) Inventors: Maik Rümmler, Breitengüssbach (DE); Moritz Obendorfer, Würzburg (DE)

(73) Assignee: Brose Fahrzeugteile SE & Co. Kommanditgesellschaft Würzburg, Würzburg (DE)

( * ) Notice: Subject to any disclaimer, the term of this patent is extended or adjusted under 35 U.S.C. 154(b) by 242 days.

(21) Appl. No.: 18/628,999

(22) Filed: Apr. 8, 2024

(65) Prior Publication Data

US 2024/0333108 A1 Oct. 3, 2024

Related U.S. Application Data

(63) Continuation of application No. PCT/EP2022/077497, filed on Oct. 4, 2022.

(30) Foreign Application Priority Data

Oct. 8, 2021 (DE) ..................... 10 2021 211 365.6

(51) Int. Cl.
*H02K 11/215* (2016.01)
*H02K 5/15* (2006.01)
*B60T 13/74* (2006.01)

(52) U.S. Cl.
CPC ............. *H02K 11/215* (2016.01); *H02K 5/15* (2013.01); *B60T 13/745* (2013.01); *H02K 2211/03* (2013.01)

(58) Field of Classification Search
CPC ...... H02K 11/21; H02K 11/215; H02K 11/30; H02K 11/33; H02K 5/225; H02K 11/225; H02K 5/22; H02K 5/15; H02K 2211/03; H02K 7/116; B60T 7/042; B60T 8/326; B60T 13/745; B60T 2220/04; G01D 11/30
USPC .................................................. 310/71, 68 B
See application file for complete search history.

(56) References Cited

U.S. PATENT DOCUMENTS

| | | | | |
|---|---|---|---|---|
| 8,929,079 | B2 | 1/2015 | Watanabe et al. | |
| 9,025,319 | B2 | 5/2015 | Schweichart et al. | |
| 2017/0133906 | A1* | 5/2017 | Pfeiffer .................. | H02K 11/33 |
| 2020/0328648 | A1* | 10/2020 | Kifer ...................... | B23K 26/32 |

FOREIGN PATENT DOCUMENTS

| | | | |
|---|---|---|---|
| DE | 102012017651 | A1 | 3/2013 |
| DE | 102012005101 | A1 | 9/2013 |
| DE | 102018211413 | A1 | 1/2020 |
| DE | 102019202859 | A1 | 9/2020 |

(Continued)

*Primary Examiner* — Alexander A Singh
(74) *Attorney, Agent, or Firm* — Laurence A. Greenberg; Werner H. Stemer; Ralph E. Locher

(57) ABSTRACT

An electric motor of an ancillary unit of a motor vehicle, in particular an electromechanical brake booster, contains a sensor carrier which is manufactured from a plastic and has a body to which a sensor is mounted. A plurality of contact pins are embedded in press-fit technology in the body, which are guided through in each case a corresponding fastening hole of the sensor. Furthermore, a motor vehicle has such an ancillary unit with the electric motor.

16 Claims, 9 Drawing Sheets

(56) References Cited

FOREIGN PATENT DOCUMENTS

| | | | |
|---|---|---|---|
| EP | 3167539 | A1 | 5/2017 |
| EP | 3499649 | A1 | 6/2019 |
| EP | 3174181 | B1 | 2/2021 |

* cited by examiner

ELECTRIC MOTOR OF AN ANCILLARY UNIT OF A MOTOR VEHICLE

FIELD AND BACKGROUND OF THE INVENTION

The invention relates to an electric motor of an ancillary unit of a motor vehicle. The invention furthermore relates to an ancillary unit of a motor vehicle.

Motor vehicles such as passenger motor vehicles have a multiplicity of ancillary units which do not directly serve for propelling the motor vehicle. Ancillary units of this type are required for operating the main drive, for example, or serve to provide or enhance the comfort level for the user of the motor vehicle. An ancillary unit of this type is, for example, an electromotive adjustment drive such as an electromotive window regulator. Alternatively, the ancillary unit is an electromotive refrigerant compressor, for example, which is in particular a constituent part of a refrigerant circuit of the motor vehicle.

In another alternative, the electric motor is a constituent part of the brake system of the motor vehicle. The electric motor herein is, for example, a constituent part of an anti-lock brake system, of a traction control system, or of a brake force distributor activated by an electric motor. However, it is also possible for the electric motor to be used in a brake booster. In the latter, an applied pedal force is in particular boosted by means of the electric motor. For example, the brake booster is at least in part of a hydraulic design, and in particular a hydraulic pump is operated and/or potential valves are activated by means of the electric motor.

Alternatively, the brake booster is of an electromechanical design. The electromechanical brake booster herein in most instances comprises an input rod which for activating the brake is moved in a longitudinal direction by means of a foot pedal. The input rod acts on a working piston by means of which a pressure in a brake fluid system is increased. The electric motor acts on the input rod in such a way that an activation of the foot pedal is facilitated. Thus, a force to be applied by a user for activating the brake is reduced. Moreover, by virtue of the electric motor, the brake booster is independent of any actual activation of the foot pedal, and the input rod, particularly by means of the electric motor, can in particular be moved independently of the foot pedal as a function of specified driving situations, this leading to the motor vehicle being decelerated.

In order to keep wear as low as possible, the electric motor is in most instances designed as a brushless DC (BLDC) motor. In order to enable suitable energizing in the process, knowledge of a current position of a rotor relative to a stator of the electric motor is required. This knowledge is also required in order to control the electric motor to a specific speed in such a way that a braking performance of the motor vehicle corresponds to a specific requirement. A sensor is usually provided for determining the position of the rotor relative to the stator, or the rotating speed of the rotor, respectively. The sensor comprises, for example, an encoder wheel which is co-rotationally fastened to a rotor shaft and is of a partially magnetic design. The position of the magnetic blades of the encoder wheel is detected by means of a co-rotationally held circuit board of the sensor, for which purpose the circuit board has corresponding conductor paths into which an electric voltage which depends on the position/rotating speed of the encoder wheel relative to the circuit board is induced. It is necessary herein for the circuit board to be disposed perpendicularly to the rotor axis of the rotor shaft, about which rotor axis the rotor shaft and thus the encoder wheel are rotated during operation. The circuit board is usually rigidly fastened to a support which is fastened to further constituent parts of the electric motor, such as a bearing shield. Due to the comparatively tight space conditions in the electric motor, the fastening of the circuit board to the support is performed prior to assembling the latter on the bearing shield. Consequently, it is necessary to choose comparatively tight manufacturing tolerances in the case of the bearing shield, the support, the circuit board and the respective mutual fasteners, so that the circuit board is disposed perpendicularly to the rotor axis after assembly. The production costs are increased as a result. Furthermore, it is necessary for the support to which the circuit board is fastened to be aligned on the bearing shield during assembly. Owing to the tight space conditions, this can only be performed with a comparatively high level of difficulty, not least because a potential assembly tool cannot engage on the circuit board in order to avoid damage to the latter.

SUMMARY OF THE INVENTION

The invention is based on the object of specifying a particularly suitable electric motor of an ancillary unit of a motor vehicle, and a particularly suitable ancillary unit of a motor vehicle, wherein production is suitably simplified, and wherein production costs are advantageously reduced.

In terms of the electric motor, this object is achieved according to the invention by the features of the independent electric motor claim, and in terms of the ancillary unit by the features of the independent ancillary motor claim. Advantageous refinements and design embodiments are the subject matter of the respective dependent claims.

The electric motor is a constituent part of an ancillary unit. The electric motor is suitable, in particular provided and specified, for this purpose. The ancillary unit is a constituent part of a motor vehicle. In other words, the ancillary unit in the intended state is assembled on further constituent parts of the motor vehicle. The ancillary unit is suitable, in particular provided and specified, for this purpose. The motor vehicle is in particular land-based and preferably designed with a plurality of tracks. It is suitably possible for the motor vehicle herein to be substantially freely placed, for example on a corresponding road surface. For this purpose, the motor vehicle has in particular suitable wheels. In summary, it is preferably possible for the motor vehicle to be positioned on terrain substantially irrespective of other conditions. In other words, the motor vehicle is suitably not rail-bound. The motor vehicle is preferably a passenger motor vehicle or a commercial motor vehicle such as a motor truck or bus.

In the intended use, the ancillary unit does not directly serve for propelling the motor vehicle and thus does not represent a main drive of the motor vehicle. For example, the ancillary unit herein serves for operating the main drive, or for providing functions required for the operation of the motor vehicle, said functions not serving directly for propelling the motor vehicle. Alternatively, a comfort level is enhanced, or comfort functions are provided, by means of the ancillary unit.

The ancillary unit has for example a nominal or maximal output between 100 W and 1000 W, preferably between 300 W and 700 W, and, for example, between 400 W and 500 W. The ancillary unit is, for example, an electromotive adjustment drive such as an electromotive window regulator. Alternatively, the ancillary unit is, for example, an electromotive refrigerant compressor, which is in particular a constituent part of a refrigerant circuit of the motor vehicle.

In another alternative, the ancillary unit is an electromotive pump such as a water pump. The electromotive pump is suitably a lubricant pump such as a motor oil pump or a transmission oil pump. A pump wheel which is adapted to the liquid to be pumped is in each case driven by means of the electric motor herein. In another alternative, the electric motor is a constituent part of a fan such as of a radiator fan or of a blower, which thus represent the respective ancillary unit. In one alternative, the ancillary unit is a steering servo, and a steering rod is in particular driven by means of the electric motor, or at least one steering movement of wheels of a steerable design of the motor vehicle is adjusted by means of the electric motor, or the adjustment of said wheels is facilitated by the latter.

In another alternative, the ancillary unit is a brake system or part of the brake system of the motor vehicle. The electric motor herein is, for example, a constituent part of an anti-lock brake system, of a traction control system, or of a brake force distributor activated by an electric motor. The ancillary unit is particularly preferably a brake booster, wherein a pedal force applied to a brake pedal by a user, also referred to as operator or driver, is in particular boosted by means of the electric motor during operation.

For example, the brake booster is at least in part of a hydraulic design, and in particular a hydraulic pump is operated and/or potential valves are activated by means of the electric motor.

Particularly preferably however, the brake booster is of an electromechanical design, and the ancillary unit is thus an electromechanical brake booster. A construction of the ancillary unit is consequently simplified. The electromechanical brake booster expediently comprises an input rod which for activating the brake is moved in a longitudinal direction by means of a foot pedal. The foot pedal herein is, for example, articulated directly on the input rod, or via a rod assembly. However, the foot pedal is at least operatively connected to the input rod. The input rod acts on a working piston. For example, the working piston is fastened directly to the input rod, in particular integrally molded thereon. Alternatively, a further mechanism is disposed therebetween. The working piston is in particular disposed in a pump chamber in which a brake fluid is present during operation. Depending on the direction of movement, the brake fluid is forced out of the pump chamber or suctioned into the latter during a linear movement of the working piston in the pump chamber. Potential brake pistons of brakes of a brake system of the motor vehicle are preferably hydraulically connected to the pump chamber in such a way that the brakes are activated when the brake fluid is forced out of the pump chamber.

The input rod is expediently provided with a thread on the circumference, a drive pinion with internal toothing being placed on said thread. Here, a type of spindle is formed by means of the input rod and the drive pinion. The drive pinion is expediently driven by means of the electric motor, for example directly or preferably by way of a gearbox. For this purpose, the drive pinion expediently has an external toothing. When the electric motor is energized, a force is thus introduced into the input rod by the drive pinion, and consequently also onto the working piston.

The electromechanical brake booster preferably comprises a sensor by means of which an activation of the foot pedal acting as the brake pedal is detected during operation. The electric motor is energized as a function thereof. The electromechanical brake booster suitably comprises a control apparatus by means of which the sensor is read and the energization of the electric motor is adjusted. In a refinement, the electric motor is energized by means of the control apparatus irrespective of an actual activation of the foot pedal, preferably as a function of a provided command which is in particular transmitted by way of a potential bus system. The command herein is initiated, for example, by an assistance system of the motor vehicle or of an on-board computer of the motor vehicle. The command herein is in particular initiated as a function of specific driving situations, for example by an emergency brake assistant. Alternatively or in combination therewith, the motor vehicle is designed to be partially or completely autonomous in such a way that travel takes place independently of control by a user. The command herein is in particular initiated by a so-called autopilot.

The electric motor comprises in particular a rotor which has at least one magnet, for example. During operation, the magnet expediently interacts with a magnet of a stator which preferably circumferentially surrounds the rotor and is in particular of a hollow-cylindrical design and disposed concentrically with the rotor. The rotor is expediently fastened to a rotor shaft, which is also referred to as a motor shaft, and which is manufactured integrally and/or from a steel, for example.

The electric motor expediently comprises a bearing shield by means of which a bearing is preferably held. The bearing is expediently designed as a rolling bearing, for example as a ball bearing. The rotor shaft, and in particular also the rotor, are mounted so as to be rotatable about a rotor axis by means of the bearing in such a way that the rotor shaft rotates about the rotor axis during the operation of the electric motor. However, the electric motor preferably comprises at least the rotor axis. In particular, the rotor shaft is disposed along the rotor axis and/or the rotor/stator is disposed concentrically with the rotor axis. The electric motor suitably comprises a further bearing shield by means of which a further bearing is held, the latter being of an identical construction to the bearing, for example. The rotor shaft is expediently also mounted by means of the further bearing. The further bearing shield and the bearing shield in particular are assigned to mutually opposite ends of the rotor shaft, which increases stability.

For example, the electric motor is a brush commutator motor, and the stator comprises a permanent magnet. However, the electric motor is particularly preferably a brushless electric motor, for example a brushless DC (BLDC) motor. In this case, the rotor preferably has one or a plurality of permanent magnets which is/are fastened to the rotor shaft. For example, the permanent magnets are fastened to a laminated core, or embedded in the latter, which is fastened to the rotor shaft. The stator surrounding the rotor preferably comprises one or a plurality of solenoids which are expediently divided among a plurality of phases. Each of the phases is in particular assigned the same number of solenoids, each of the latter having in particular one electric coil. The electric motor suitably comprises three phases which are connected to one another in a delta connection or star connection, for example.

The electric motor furthermore comprises a sensor which serves in particular for detecting a position and/or the rotating speed of the rotor, or at least of the rotor shaft, relative to the stator or other constituent parts of the electric motor that are co-rotationally held. For this purpose, the sensor comprises, for example, a component which is fastened to the rotor shaft, such as an encoder wheel which is designed in the manner of an impeller, for example. The encoder wheel is in particular designed so as to be at least partially magnetic. Furthermore, the sensor preferably comprises a co-rotationally held component which interacts with the rotating encoder wheel during operation. The co-rotationally held component preferably comprises one or a plurality of coils or other conductors into which an electric voltage is induced by virtue of the rotating movement of the partially magnetic encoder wheel. For example, the conductors into which the electric voltage is induced are disposed in a sinusoidal manner about the rotor axis and so as to be concentric with the latter in such a way that accuracy is increased when measuring the rotating speed/position. In particular, the sensor moreover comprises an evaluation unit which is expediently co-rotationally held and is in direct electrical contact with the conductors, for example.

The sensor is held on a sensor support, in particular fastened thereto. The sensor herein is held on a body of the sensor support that is expediently of a flat design and/or disposed perpendicularly to the rotor axis, the latter also being referred to as rotation axis or motor axis. The co-rotationally held component of the sensor is in particular fastened to the body. The sensor, or at least the co-rotationally held component thereof, is expediently disposed parallel to the body and, for example, supported on the body, or at least stabilized by means of the latter.

The sensor support is made of a plastics material and, for example, an injection-molded plastic part, manufacturing being simplified for this reason. Alternatively or in combination therewith, the sensor support is integral. A plurality of contact pins, which are designed in press-fitting technology, are expediently embedded in the body in order to hold the sensor on the latter. In this way, each contact pin is designed in the manner of a press-fit, wherein the region of the contact pin that is provided for connecting by press-fitting technology and in particular determines a press-fitting zone is expediently spaced apart from the body. However, part of the respective contact pin is embedded in the body and overmolded by means of the plastics material of the body, for example. In this way, the contact pins cannot be released from the body in a non-destructive manner. Each contact pin suitably has structures which engage in the plastics material in such a way that twisting and/or releasing is avoided even when high forces act thereon. The contact pins are in particular of identical construction. The contact pins are expediently made of a metal such as spring steel, or any other elastic material.

Each contact pin is guided through a corresponding fastening hole of the sensor. In other words, the sensor has the exact same number of fastening holes as there are contact pins, and the fastening of the sensor to the sensor support, or holding the sensor on the sensor support, respectively, takes place by means of the contact pins. The contact pins are in particular disposed perpendicularly to the assembly of the body and/or parallel to the rotor axis, this simplifying assembling of the sensor. For assembling, the latter is in particular moved along the rotor axis until the contact pins lie in the respectively assigned fastening holes. The sensor is preferably releasably fastened to the sensor support by means of the contact pins.

Elastic and/or plastic deformation expediently takes place as a result of the contact pins being guided through the fastening holes, and the contact pins are in this way press-fitted in particular into the respective fastening home. Prior to introduction, there is in particular initially a projection, and the excessive compression created during press-fitting is absorbed by a deformation of the respective fastening hole and/or by a deformation of the respective contact pin, for example. In summary, the cross section of each contact pin, or at least part thereof, that is introduced into the respective fastening hole, or is guided through the latter, is larger than the diameter of the corresponding fastening hole. The excessive compression thus takes place when the respective contact pin is press-fitted/cut into the respective fastening hole.

It is enabled by means of the contact pins that the sensor is securely held on the sensor support, wherein no additional fastening means are required after the sensor has been disposed. Assembling is thus simplified. The position of the sensor relative to the sensor support, and thus in particular also relative to the rotor axis, is also defined by means of the contact pins. Consequently, subsequent aligning of the sensor after assembling on the sensor support is not required. Assembling is thus simplified. Moreover, contact pins of this type are comparatively cost-effective, which is why production costs are reduced.

Furthermore, assembling of the sensor is simplified because the latter for assembling is fastened to the sensor support, a comparatively large area for assembling being provided by said sensor support. Moreover, a defined assembly point of the sensor, or of at least one component of the sensor, on further constituent parts of the electric motor, such as the bearing shield of the latter, is provided by means of the sensor support, so that calibrating or the like after assembling of the sensor is not required. Assembling is thus simplified. By virtue of the sensor being stabilized by the sensor support, it is also avoided that the sensor is offset relative to the rotor axis and thus also relative to the potential rotor shaft during operation. Robustness is consequently increased. It is also possible for this part of the sensor to be prefabricated and to be fastened to the sensor support in one operative step, this further simplifying assembling. Furthermore, that part of the sensor that is held on the body is inherently stable in this way, this increasing robustness.

Besides holding the sensor on the sensor support, the contact pins in particular do not assume any further function. Consequently, there are comparatively low requirements set for the contact pins, so that a multiplicity of most varied contact pins can be used, this increasing flexibility. In particular, the contact pins are electrically isolated in relation to one another as well as in relation to further constituent parts of the sensor and/or of the sensor support. During operation, no electrical voltage and/or electric current is in particular conducted by way of the contact pins. The fastening holes are in each case preferably electrically isolated in relation to further constituent parts of the sensor. The functional mode of the sensor is consequently not influenced by virtue of the contact pins.

The sensor particular preferably comprises a circuit board which comprises the fastening holes. That part of the sensor that is held on the sensor support herein is in particular formed by means of the potential circuit board. Stability is increased by virtue of the circuit board, whereby the sensor is however comparatively rather brittle due to the circuit board. However, damage to the circuit board is prevented during assembly by virtue of the use of the contact pins. The fastening holes are in particular metalized and thus provided with a metal, which increases robustness.

The circuit board comprises in particular a circuit board body which is made of a glass fiber-reinforced epoxy resin and to which, or in which, a plurality of conductor paths are fastened/embedded. The circuit board suitably comprises one or a plurality of electrical and/or electronic components by means of which a circuit is formed, for example. The components herein are in particular in electrical contact with at least some of the conductor paths. The assembling of the sensor is made possible in one operative step by virtue of the circuit board, which is why a production of the electric motor is simplified. The circuit board preferably comprises the potential conductors into which the electrical voltage is induced by means of the potential encoder wheel during the operation, and/or which are disposed sinusoidally about the rotor axis and so as to be concentric with the latter. The circuit board comprises in particular the potential evaluation unit.

Each contact pin suitably has a press-fitting zone which in the assembled state is disposed within the respective fastening hole. When disposing the respective contact pin in the respective fastening hole, the press-fitting zone is elastically and/or plastically deformed in the process, this leading to pre-loading of the contact pin. This pre-load ensures that the connection between the circuit board and the contact pin is maintained even when a force acts thereon during the operation of the electric motor.

Each contact pin, expediently in the region of the press-fitting zone, particularly preferably has an needle eye-type opening, in particular prior to assembling. In the assembled state, this needle eye-type opening suitably lies in the respectively assigned fastening hole and is elastically deformed in such a way that the needle eye-type opening has a deviating shape. In other words, each contact pin is designed in the manner of needle-eye technology. Production of the contact pins is simplified in this way, which is why production costs are reduced.

For example, the body is designed to be planar in the region of the contact pin. Particularly preferably however, each contact pin on that side that faces the sensor is surrounded by a depression of the body. The depression is circular or rectangular, for example. The robustness of the connection between the contact pin and the body is indeed reduced due to the depression. However, bending or deforming the respective contact pin perpendicularly to the direction of the disposal of the latter is possible by virtue of the depression in such a way that prevailing tolerances can in particular be equalized. Consequently, it is possible for the sensor support and the position of the attachment of the contact pins to the sensor support to be chosen with comparatively high manufacturing tolerances, which is why production is simplified. Moreover, owing to the depression, it is possible to position the contact pins at a specific position in a mold/production tool by means of a corresponding slide during production, said mold/production tool subsequently being filled with plastics material in order to produce the sensor support. In the process, the depression is formed by means of that slide by means of which the respective contact pin is held, so that a comparatively precise positioning of the contact pin in the mold is made possible by virtue of the slide. Furthermore, demolding from the mold and discharging of heat are improved by virtue of the depression, so that a reject rate during production is reduced.

For example, the sensor, in particular the circuit board, rests directly on the body. Particularly preferably however, domes pointing in the direction of the sensor are attached to, in particular integrally molded on, the body. The sensor rests on the end sides of the domes of the sensor support, said sensor being supported by means of the domes in this way. Flexing or breaking of the sensor during assembling and also during operation is avoided by virtue of the domes, in particular if the circuit board is fastened to the body. Moreover, there is no punctiform load acting on the sensor, in particular the circuit board, when the body is deformed, for example during operation or in the case of the body not being of a completely planar design, which would lead to damage, for example. Moreover, specific resting points are achieved by means of the domes in such a way that comparatively stable fastening of the sensor to the sensor support is also made possible, whereby the sensor rests on all of the domes. Consequently, no relative movement of the sensor in relation to the domes arises even in the event of vibrations, which is why the generation of noise is avoided. Furthermore, a maximum introduction of the contact pins into the respective fastening holes is defined by means of the domes. In other words, it is avoided by means of the domes that the fastening holes are moved beyond the potential press-fitting zones, where the sensor is no longer securely held on the sensor support. Consequently, robustness is increased by virtue of the domes.

The sensor support has in particular between 2 and 10 domes of this type, so that a comparatively stable support is implemented on the one hand. However, it is ensured in this way that the sensor rests on all domes even in the case of comparatively high manufacturing tolerances, said sensor not being deformed to this end. Two domes of this type are expediently assigned to each contact pin, wherein each contact pin is disposed between the two assigned domes, in particular in a tangential direction relative to the rotor axis, the latter also being referred to as rotation axis. Tilting of the sensor relative to the body, in particular the circuit board, is prevented in this way. Consequently, the measuring accuracy of the sensor is increased.

For example, all of the domes have the same cross section perpendicular to the rotor axis, and are thus of identical construction. For example, the cross section perpendicular to the rotor axis is a rectangle, in particular an elongate rectangle, which is why a supporting effect by means of the domes is improved. Particularly preferably however, at least one of the domes has an opening pointing toward the sensor so that the cross section of this dome also comprises the opening. The dome herein is suitably designed to be round, and the cross section of the dome perpendicular to the rotor axis is in particular annular. The opening is for example continuous through the body, or the body is preferably intact in such a way that the opening is in particular design as a blind bore.

The sensor suitably comprises an assembly hole which is disposed so as to be co-aligned with the opening of the dome. In other words, the peripheries of the assembly hole and of the opening are co-aligned. For assembling, a pin or the like is in particular inserted into the opening, and the assembly hole of the sensor is placed thereon in such a way that the sensor is aligned relative to the sensor support. A clearance fit between the pin and the assembly hole/the opening is suitably implemented in the process. Consequently, a comparatively high force is also able to be applied to the sensor along the rotor axis during assembly, so as to achieve a comparatively reliable introduction of the contact pins into the fastening holes. Tilting, canting and/or offsetting of the sensor relative to the sensor support, and also kinking of the contact pins, is avoided by virtue of the pin in the process. The pin is in particular removed after the sensor has been assembled on the sensor support, so that a weight of the electric motor as well as a space required are reduced. In this way, the pin can also be used for producing a multiplicity of electric motors.

At least two of the domes suitably have the corresponding opening, and the sensor thus comprises in particular at least two assembly holes. Consequently, a position of the sensor relative to the sensor support is precisely defined during assembling, which is why assembling is simplified. For example, more than two domes have an opening of this type, and the sensor has more than two assembly holes, which increases robustness during assembling. Particularly preferably however, only exactly two of each are in each case present so that tilting is avoided even in the case of comparatively large manufacturing tolerances.

In particular, all of the domes have the opening pointing toward the sensor. Particularly preferably however, only some of the domes have the corresponding opening, whereby the remainder of the domes are in particular designed to be intact. Consequently, a supporting effect is improved, whereby the tilting in the case of large manufacturing tolerances is avoided during assembling.

The body is preferably disposed perpendicularly to the rotor axis, which is why a perpendicular disposal of the sensor relative to the rotor axis is facilitated. The sensor support preferably comprises a plurality of arms which are attached peripherally to the body, thus adjoining the latter in the radial direction relative to the rotor axis, or being at least located on this periphery. The arms are expediently integrally molded on the body. The arms run at least in part, preferably completely, parallel to the rotor axis, whereby the arms, in particular all arms, are disposed along the rotor axis on the same side of the body. The arms, preferably those ends of the arms that lie opposite the body, are fastened to the bearing shield.

Owing to the arms of the sensor support, the body, and thus also the sensor, is spaced apart from the bearing shield. Consequently, no interference effects on the sensor are caused by the bearing shield and the fastening of the sensor support on the bearing shield, so that a quality of the sensor signals generated by the sensor is improved. A failure of the sensor is avoided due to the absence of the interference effect, which is why reliability is increased. Owing to the sensor being stabilized by the bearing shield via the sensor support, it also avoided that the sensor is offset relative to the rotor axis, and thus also relative to the potential rotor shaft, during operation. Robustness is consequently increased. It is also possible to generate a permanent connection between the sensor and the bearing shield by means of the arms, which is why robustness is increased.

Moreover, by virtue of being spaced apart from the bearing shield, the sensor also does not impact on the bearing shield per se even when the electric motor is subjected to shock, which is why damage to the sensor is avoided. By virtue of the sensor being spaced apart from the bearing shield by means of the arms, it is furthermore possible to make the bearing shield of a metal, whereby any repercussion pertaining to the operation of the sensor is precluded. Consequently, robustness of the bearing shield is increased, whereby it is not necessary to pay attention to an ideally minor interaction with the sensor in the choice of material of the bearing shield, so that a choice of material is enlarged. In particular, no diamagnetic or paramagnetic material is required for producing the bearing shield, which is why production costs are reduced. The bearing shield is particularly preferably made of a metal, for example an aluminum or a steel, for example by means of deep-drawing. The robustness is further increased in this way.

By virtue of the sensor being fastened to the bearing shield via the sensor support, it is moreover possible to dispose said sensor within a housing of the electric motor or at least proximal to the rotor/stator. In this way, the sensor is protected by means of the bearing shield and potential further constituent parts of the electric motor such as the housing of the latter, so that stability and robustness are likewise increased.

For example, the sensor support comprises two or more arms of this type. For example, the sensor support comprises four arms, five arms or up to ten arms. Stability is increased in this way. Particularly preferably however, the sensor support comprises only three or four arms of this type. Space requirement is reduced in this way, whereby the position of the body relative to the bearing shield is not overdetermined, or only to a minor extent. In other words, tilting of the body relative to the bearing shield is avoided in this way, whereby all of the arms are in contact with the bearing shield even in the case of comparatively high manufacturing tolerances. Expediently, the arms are mutually offset by at least 45°, 70°, 80° or 90° relative to the rotor axis, this further increasing stability.

The bearing shield, or at least part of the bearing shield, is suitably disposed perpendicularly to the rotor axis so that mounting of the potential rotor shaft by means of the bearing shield is simplified. In particular, the sensor or at least the component/part of the sensor held on the sensor support is disposed so as to be at least partially perpendicular to the rotor axis, this simplifying operation of the sensor. Also, an accuracy when detecting the position/rotating speed is increased in this way. The arms suitably have a length along the rotor axis, the latter being parallel to an axial direction, between 0.5 cm and 5 cm, between 1 cm and 3 cm, and of 2 cm, for example. In this way, a space requirement is not excessively increased, on the one hand. On the other hand, any interaction between the sensor and the bearing shield is substantially precluded in this way.

Particularly preferably, the sensor support and/or the sensor, thus the part/component of the sensor, such as the circuit board, fastened to the body, surrounds the rotor axis in such a way that the sensor support, in particular the body, and/or the sensor/circuit board are designed to be at least partially annular.

For example, the contact pins are disposed arbitrarily relative to the arms, or are offset relative to the latter. Particularly preferably however, each of the contact pins is in each case disposed above one of the arms, and the electric motor has exactly as many contact pins as arms, for example. Due to the arrangement, the projection of each arm onto a plane perpendicular to the rotor axis superimposes the projection of the assigned contact pin thereon. Due to an arrangement of this type, the force applied to the contact pins parallel to the rotor axis during assembling of the sensor is absorbed by means of the arms and introduced into the bearing shield. In this way, no deformation, or only a minor deformation, of the sensor support occurs, whereby at least flexing or deforming of the body is avoided. Consequently, damage to the sensor support during assembling and also tilting of the contact pins is avoided, whereby comparatively high forces can nevertheless be applied to the sensor for assembling. In this context, the domes by means of which the maximum press-fitting depth of the contact pins in the respective fastening hole is defined are in particular present. Particularly preferably, each dome is in each case likewise disposed above one of the arms in such a way that no damage to the sensor support, such as breakage of the body, takes place when the sensor rests on the domes. A deformation of the sensor, in particular of the circuit board, is also prevented in this way.

For example, the bearing shield is substantially planar, which simplifies manufacturing. Particularly preferably however, the bearing shield has a pot-shaped elevation which thus comprises a hollow-cylindrical portion which is in particular disposed concentrically with the rotor axis and extends along the latter. The hollow-cylindrical portion is closed off by a base which is disposed perpendicularly to the rotor axis. Moreover, the bearing shield preferably has a periphery which extends radially outward and adjoins the elevation, thus being annular and disposed concentrically with the rotor axis. The periphery herein is attached to that end of the hollow-cylindrical portion that lies opposite the base along the rotor axis. Consequently, the bearing shield has the shape of a hat. Consequently, robustness of the bearing shield is increased, flexing being in particular prevented.

The body is particularly preferably supported on the base of the elevation and rests directly on said base, for example, or via further constituent parts. In this way, the body is stabilized by means of the base of the bearing shield. In this way, the sensor is not damaged when being assembled on the body, this further simplifying assembling. It is not necessary for the body here to be designed to be comparatively robust and consequently heavy. The arms are expediently fastened to the periphery. In this way, the arms encompass the elevation. By virtue of the elevation, the sensor is in particular offset relative to the periphery in the direction of the rotor/stator, and in particular away from attachment points of the electric motor to further constituent parts of the ancillary unit and/or to the component of the ancillary unit driven by means of the electric motor. In this way it is possible for a comparatively compact electric motor to be provided. The arms suitably rest on the elevation, preferably circumferentially on the hollow-cylindrical portion, and are stabilized by means of said elevation. Robustness is thus further increased, and assembling of the sensor support simplified.

In the process, the position/alignment of the body, and therefore also of the sensor, along the rotor axis is determined in a comparatively precise manner by means of the base in such a way that comparatively high manufacturing tolerances can be chosen in the production of the sensor support. Said manufacturing tolerances are in particular equalized by way of a potential deformation of the arms during assembling of the latter on the bearing shield. In order for the sensor support to be assembled on the bearing shield, the arms are in particular subjected to tensile stress in such a way that a pre-load is established. Consequently, the body is pressed onto the base. The position of the sensor along the rotor axis is always constant in this way, even when the electric motor is subjected to shock.

For example, the body rests directly on the base, in particular across the full area. Particularly preferably however, a plurality of webs which project parallel to the rotor axis are integrally molded on the body on that side that faces the base. The webs rest directly on the base. In this way, the body is supported by means of the webs and a potential equalization of tolerances is made possible by means of the webs. Stable resting is nevertheless provided also in the case of, for example, a minor distortion of the base or of the body in comparison to resting on the entire area. Each web is rectilinear, for example, or bent in portions, whereby the center of the arc suitably lies on the rotor axis. The webs are mutually spaced apart, for example. However, the webs are preferably connected to one another in such a way that said webs are mutually stabilized, which increases robustness.

For example, the arms are in each case inserted into a corresponding slot of the bearing shield and fastened thereto in this way. Particularly preferably however, the arms are radially angled at the end sides in order to form in each case one tab. For example, the tabs herein point radially inward in such a way that a space requirement is reduced. Particularly preferably however, the tabs are angled radially outward, which is why access to the tabs is made possible even after the sensor support has been placed onto the bearing shield. Fastening of the arms to the bearing shield across a large area is made possible by virtue of the tabs, and said arms are stabilized relative to the bearing shield, which increases robustness.

For example, the tabs are fastened to the bearing shield in a materially integral manner, for example by means of adhesive bonding or welding. Particularly preferably however, each tab has a through-opening which runs in particular so as to be parallel to the rotor axis. Each of the through-openings is penetrated by a respective fastening means. In the process, assembling is facilitated by virtue of the tabs which are angled radially outward, in particular if the elevation is present. A defined position of the fastening means is defined by virtue of the through-openings, and assembling is consequently simplified.

For example, the respective fastening means is a screw which thus protrudes through the respective through-opening. For example, the screws are screwed into the bearing shield, or engage through the latter. Alternatively, a threaded bolt as the respective fastening means is fastened to the bearing shield, for example fixedly welded thereto or integrally molded thereon. Consequently, it is possible for the bearing shield to already be produced with the fastening means, and the sensor support, thus the respective tabs, are placed onto the respective fastening means for assembling. Subsequent fixing of the tabs expediently takes place by a nut which is screwed onto the respective fastening bolt.

Particularly preferably however, the respective fastening means is a rivet of the bearing shield. Consequently, the bearing shield has a number of rivets corresponding to the number of tabs, said rivets being disposed, expediently integrally molded, for example on further constituent parts of the bearing shield such as the potential periphery. For assembling, each tab is placed onto the respectively assigned rivet and said tab is subsequently plastically deformed, such as caulked. The rivet herein is in particular a wobble rivet, thus a radial rivet, and the riveting takes place by means of wobbling. In this way, the force required for fastening is reduced. A robust durable connection of the sensor support to the bearing shield is implemented by virtue of the use of the rivets, which is why robustness is increased.

For example, the sensor is already fastened to the sensor support prior to the sensor support being assembled on the bearing shield. Particularly preferably however, the fastening of the sensor takes place only once the sensor support has been fastened to the bearing shield, so that the sensor is not damaged during the riveting process. This is possible by virtue of the use of the sensor support, whereby a comparatively precisely specified position for the sensor is nevertheless generated by means of the rivets and the sensor support. Moreover, pre-loading of the sensor support suitably takes place by means of the rivets, in particular if the potential elevation is present. In other words, potential manufacturing tolerances of the sensor support are compensated for by virtue of the rivets. Moreover, by virtue of the rivets, no opening through which foreign particles or fluids could ingress during operation is required in the bearing shield. In other words, a resistance to media is not compromised, whereby no additional sealing is required, which is why production costs are reduced and manufacturing is simplified. For example, that side of each tab that faces the bearing shield, in particular rests on the latter, is planar. Particularly preferably however, a ring, which is disposed concentrically with the respective through-opening, is integrally molded on the tab on that side of each tab that faces the bearing shield. In this way, each of the tabs is assigned a corresponding ring, and the ring preferably rests on the bearing shield. Consequently, a reduced resting face or contact face in relation to the bearing shield is provided, which is why potential vibrations of the bearing shield are not transmitted to the sensor support, or only to a minor extent. Moreover, tilting of the tabs during fastening to the bearing shield is avoided by virtue of the ring, and stability is consequently increased. It is also the case that, with a view to a play-free assembly on the bearing shield, attention has only to be paid to the disposal of the rings in one plane, whereby comparatively high manufacturing tolerances can be chosen elsewhere, this reducing production costs. For example, one end of the respective tab mimics the shape of the ring in such a way that the tab and the ring are partially co-aligned. A size of the tab is consequently reduced.

For example, that side of each tab that faces away from the bearing shield is designed to be planar. Particularly preferably however, each through-opening is partially surrounded by a flange which projects parallel to the rotor axis on that side that faces away from the bearing shield, said flange thus being designed to be annular. A spacing is expediently formed between the through-opening and the flange. A stability of the tab is increased by virtue of the flange, whereby it is not necessary for the tab to be designed as a solid body. In this way, distortion during demolding from a production tool/mold is avoided, and a reject rate during production is consequently reduced. A weight of the sensor support is also reduced.

Ribs which run radially relative to the respective through-opening are particularly preferably integrally molded on the flange. The flange is in particular stabilized by means of these ribs in such a way that even comparatively high forces can be absorbed during potential riveting/caulking. Additionally or alternatively, a funnel-shaped receptacle space, which is in particular partially delimited by means of the flange, is formed between the flange and the through-opening. In particular, the head of the potential rivet is partially formed during riveting by means of the receptacle space in the process. In this way, a number of required tools is reduced, and production is simplified.

The ancillary unit is a constituent part of a motor vehicle, the latter being, for example, a commercial motor vehicle such as a bus or a motor truck. Particularly preferably, the ancillary unit in the assembled state is a constituent part of a passenger motor vehicle. The ancillary unit herein does not directly serve for propelling the motor vehicle, but for operating a main drive, for example, for providing comfort functions and/or adjusting a direction of movement of the motor vehicle. The ancillary unit is particularly preferably a brake booster which is particularly preferably of an electromechanical design. During operation of the electric motor, a pressure in a brake fluid system is in particular increased by means of the brake booster herein. The brake fluid system herein preferably comprises a pump chamber of the electromechanical brake booster, suitably a compensation chamber and preferably a plurality of brake pistons, wherein at least one brake piston is in particular assigned to each wheel of the motor vehicle. Each wheel is suitably assigned a plurality of brake pistons which are in particular disposed on a brake caliper.

The ancillary unit has at least one electric motor and a component driven by the latter, wherein the driven component comprises in particular a drive pinion or any other further gear wheel which suitably engages with a gear wheel of the electric motor. The electric motor comprises a sensor support which is made of a plastics material and has a body on which a sensor is held. A plurality of contact pins are embedded in the body by press-fitting technology, said contact pins being in each case guided through a corresponding fastening hole of the sensor.

The invention furthermore relates to a motor vehicle having an ancillary unit of this type.

The refinements and advantages explained in the context of the electric motor apply in an analogous manner also to the ancillary unit/the motor vehicle and to one another, and vice versa.

An exemplary embodiment of the invention will be explained in more detail hereunder by means of the drawing,

DETAILED DESCRIPTION OF THE INVENTION

Functionally equivalent parts are provided with the same reference signs in all figures.

Figure 1:
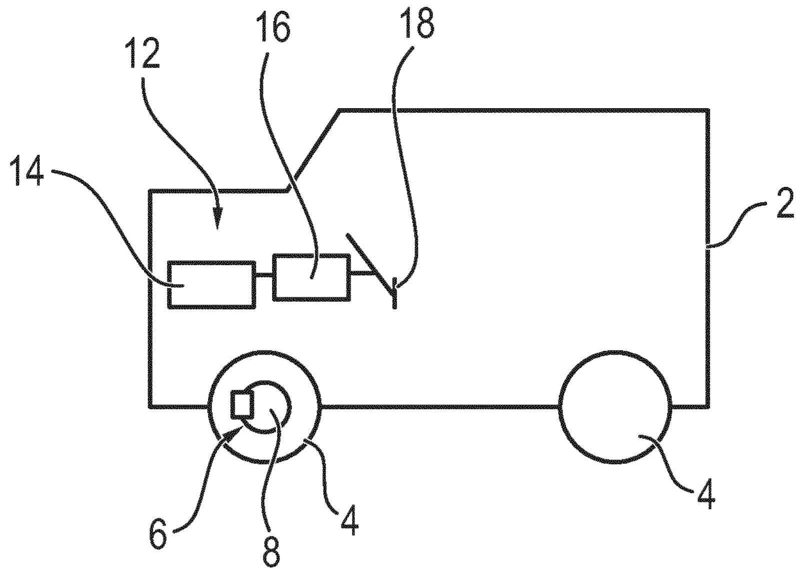
FIG. 1 schematically shows a motor vehicle having an electromechanical brake booster.

A motor vehicle 2 in the form of a passenger motor vehicle is illustrated in a schematically simplified manner in FIG. 1. The motor vehicle 2 has a plurality of wheels 4 by means of which contact with a road surface, not illustrated in more detail, takes place. Some of the wheels 4 are driven by means of a main drive, not shown.

For deceleration, the motor vehicle 2 has a plurality of brakes 6 of which only one is illustrated. Each of the brakes 6 comprises a brake disk 8 which is co-rotationally connected to the respectively assigned wheel 4. A brake caliper 10 of the brake 6, which has a plurality of brake pistons not illustrated in more detail, is fixedly held on the bodywork.

The brake pistons are a constituent part of a brake fluid system 12 which has a compensation vessel 14 that is fluidically coupled to the brake pistons. Furthermore, an ancillary unit 16 in the form of an electromechanical brake booster is coupled to the compensation vessel 14. This brake booster is activated by means of a foot pedal 18, specifically a brake pedal. The brake fluid system 12 is filled with a brake fluid, and, when the foot pedal 18 is activated, a pressure in the brake fluid system 12 is increased by means of the electrical ancillary unit 16, thus the electromechanical brake booster, in such a way that the brake pistons are activated by way of the compensation vessel 14. Consequently, brake pads which are fastened to the brake caliper 10 are pressed against the assigned brake disk 8 in such a way that the motor vehicle 2 is decelerated.

Figure 2:
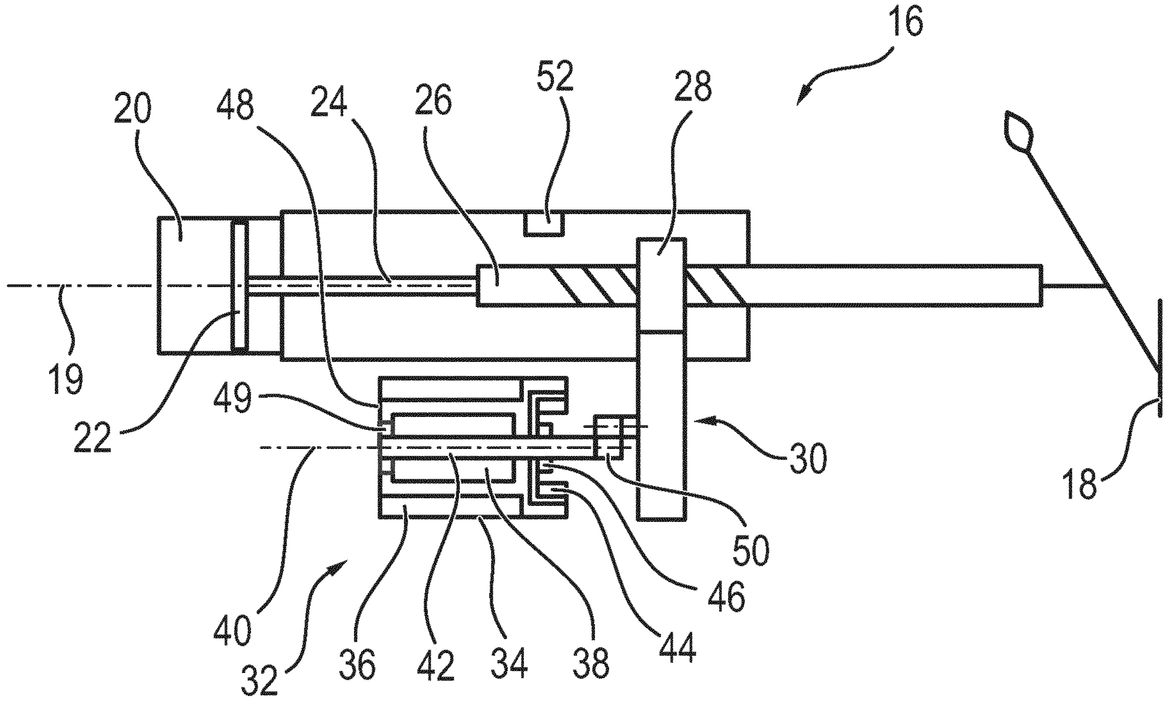
FIG. 2 schematically shows the electromechanical brake booster, which has an electric motor, in a sectional illustration.

In FIG. 2, the ancillary unit 16, thus the electromechanical brake booster, is illustrated in a sectional illustration along a longitudinal axis 19. This ancillary unit 16 has a pump chamber 20 within which is disposed a working piston 22, the latter being guided along the longitudinal axis 19 by means of the lateral wall of the pump chamber 20. The working piston 22 reaches up to the internal walls of the pump chamber 20 in such a way that the latter is divided into two parts by means of the working piston 22. One of the parts is fluidically connected to the compensation vessel 14 by way of an outlet, not illustrated in more detail, and is completely filled with the brake fluid. In this way, the quantity of the brake fluid disposed in the pump chamber 20 is varied when the working piston 22 moves in the pump chamber 20.

The working piston 22 is fastened to an input rod 26 by way of a connecting rod 24 which is disposed parallel to the longitudinal axis 19, said input rod 26 likewise extending along the longitudinal axis 19 and being mounted so as to be displaceable along the longitudinal axis 19 by means of a mounting, not illustrated in more detail. However, the input rod 26 herein is co-rotationally mounted in such a way that rotation of the input rod 26 is avoided. The input rod 26 is supported on the foot pedal 18 by means of a mechanism on the end lying opposite the connecting rod 24.

When the foot pedal 18 is activated, the input rod 26 and consequently also the connecting rod 24 are moved along the longitudinal axis 19 in such a way that the working piston 22 is also moved. Consequently, the brake fluid is forced out of the pump chamber 20. Furthermore, the ancillary unit 16 has a spring which is not illustrated in more detail and by means of which the input rod 26, and therefore also the connecting rod 24, and consequently also the working piston 22, are impinged. Due to the spring force, the working piston 22 is moved out of the pump chamber 22 as far as possible in such a way that a volume of brake fluid received by the pump chamber 20 is at the maximum.

The input rod 26 has an external toothing, and placed thereon is a drive pinion 28 which in turn has an internal toothing. The input rod 26 and the drive pinion 28 are thus designed in the manner of a spindle. Additionally, the drive pinion 28 has an external toothing and engages with a gearbox 30. The gearbox 30 is driven by means of an electric motor 32 which comprises a pot-shaped motor housing 34 within which is disposed a hollow-cylindrical stator 36. A likewise hollow-cylindrical rotor 38 is disposed concentrically with a rotor axis 40 within the stator 36 and is co-rotationally fastened to a rotor shaft 42 running concentrically with the rotor axis 40. Consequently, the rotor shaft 42 is disposed along the rotor axis 40. The rotor shaft 32 is mounted so as to be rotatable about the rotor axis 40 by means of a bearing 46 that is fastened to a bearing shield 44. The bearing 46 herein is designed as a ball bearing and disposed in the region of one of the ends of the rotor shaft 42. Moreover, the electric motor 32 has a further bearing shield 48 which is formed by means of the motor housing 34. A further bearing 49, by means of which the rotor shaft 42 is likewise rotationally mounted, is fastened to the further bearing shield 48. The further bearing 49 herein is assigned to the other end of the rotor shaft 42.

The rotor 38 comprises a laminated core which is not illustrated in more detail and on which permanent magnets, likewise not illustrated in more detail, are held, said permanent magnets during operation interacting with solenoids of the stator 36, that are in each case formed by means of an electric coil, in such a way that the rotor 38 and therefore also the rotor shaft 42 are rotated about the rotor axis 40. Consequently, the electric motor 32 is designed as a brushless DC (BLDC) motor. A gear wheel 50 which engages with the gearbox 30 is co-rotationally fastened to the end side on the rotor shaft 42. In this way, a transmission of force from the rotor shaft 42 to the gearbox 30 take place via the gear wheel 50 which meshes with a corresponding gear wheel of the gearbox 30.

The ancillary unit 16 furthermore comprises a further sensor 52 by means of which an activation of the foot pedal 18, specifically an offset of the input rod 26 along the longitudinal axis 19, is detected. The electric motor 32 is energized as soon as this has been detected, so that the drive pinion 28 is rotated by way of the gearbox 30. By virtue of the interlocking action with the input rod 26, an additional force is applied to the input rod 26 along the longitudinal axis 19 in this way, so that the activation of the foot pedal 18 is assisted. Owing to the force exerted by means of the drive pinion 28 and the activation of the foot pedal 18, the working piston 22 is moved in the pump chamber 20, and a driver of the motor vehicle 2 is thus assisted during braking. In summary, the force to be applied for braking by the driver is reduced, which enhances the level of comfort. It is also possible for the ancillary unit 16, thus the electromotive brake booster, to be activated in a manner completely independent of the activation of the foot pedal 18. Consequently, braking of the motor vehicle 2 is performed independently of the activation of the foot pedal 18, for example in the context of emergency braking, or during an automatic/autonomous operation of the motor vehicle 2.

Figure 3:
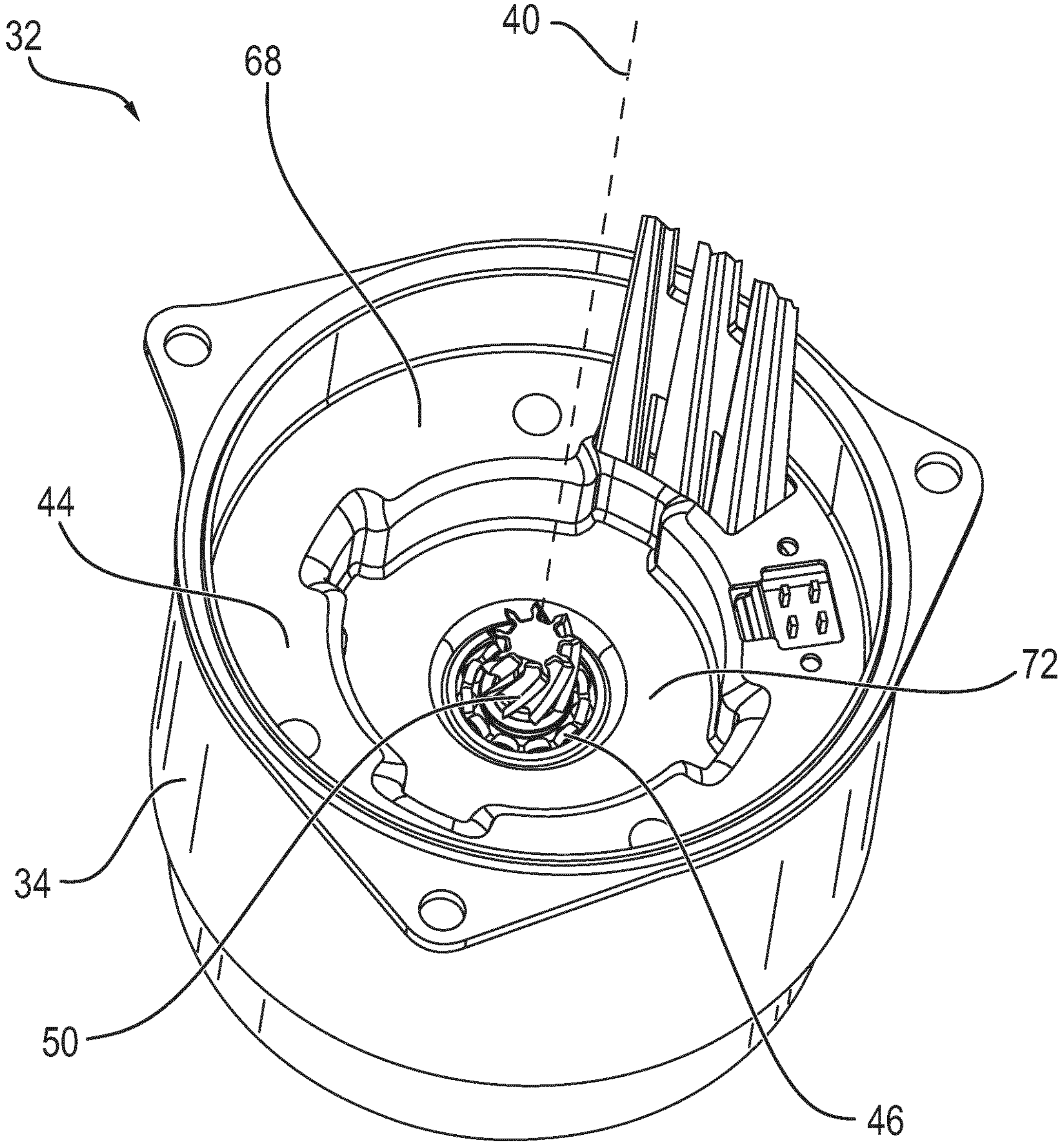
FIG. 3 shows a perspective fragmented view of the electric motor having a bearing shield.

The electric motor 32 in which the motor housing 34 is closed off by means of the bearing shield 48 is illustrated in a perspective view in FIG. 3. The bearing shield is made of a metal, specifically aluminum, as is the motor housing 34.

Figure 4:
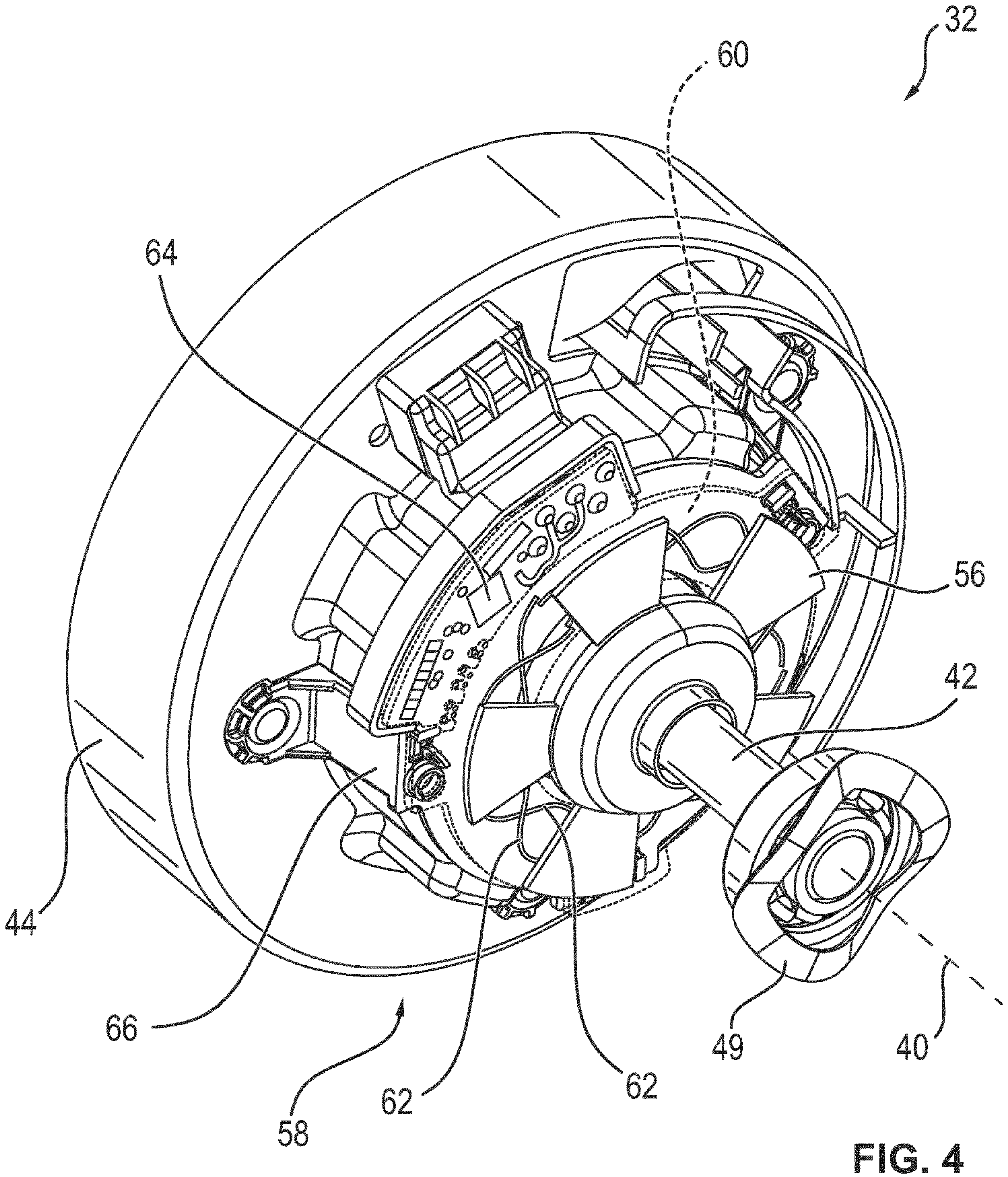
FIGS. 4, 5 show in each case a perspective fragmented view of the bearing shield having a sensor support fastened thereto, a sensor being fastened to said sensor support.
Figure 5:
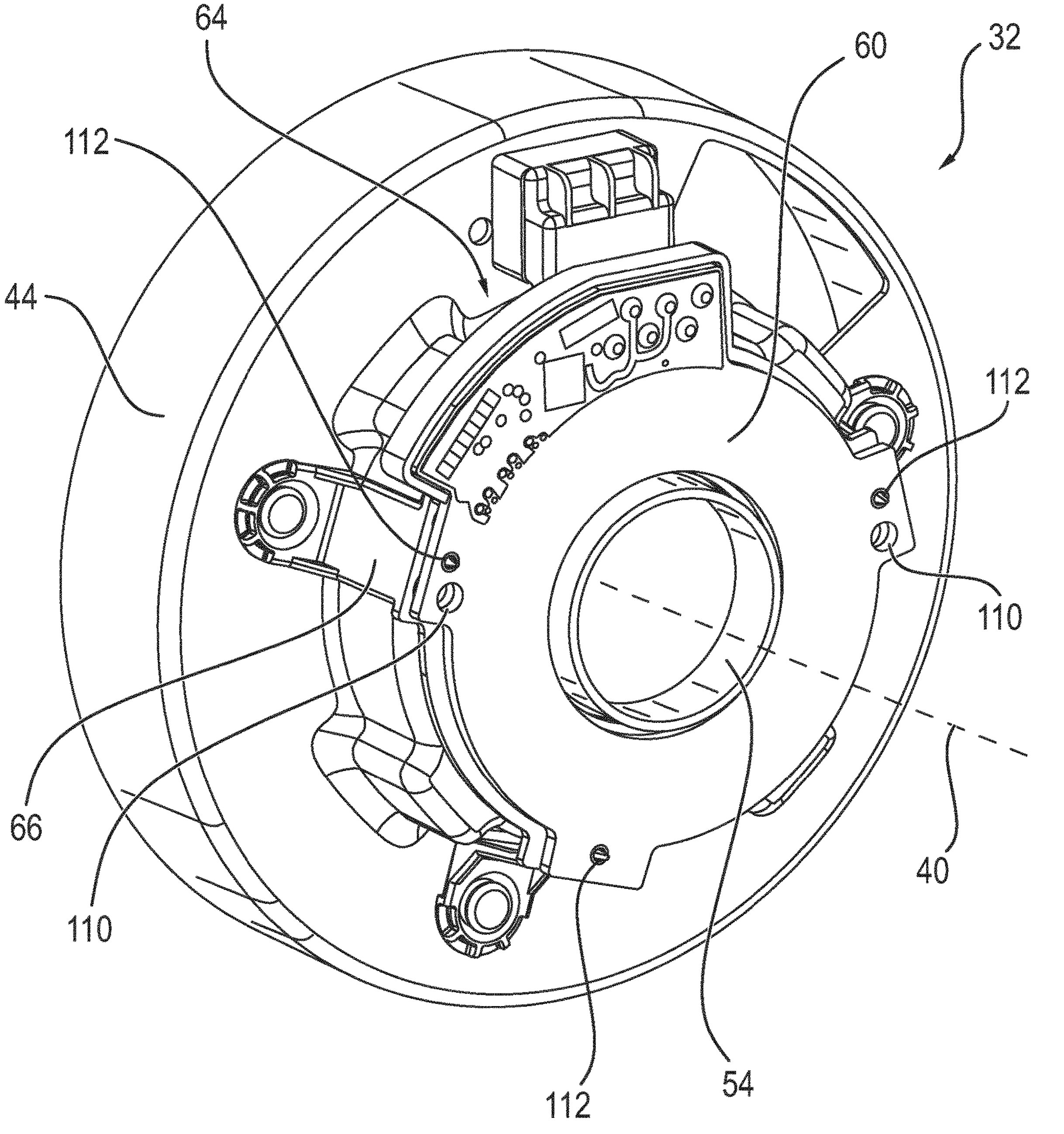

The bearing shield 44 is in each case illustrated in a perspective view in FIG. 4 and FIG. 5, specifically viewed from the side that lies opposite the side shown in FIG. 3. The rotor shaft 42, which on the end side is mounted by means of the further bearing 49, protrudes through the bearing shield 44. The bearing 46 is co-rotationally held in a round receptacle 54 which is disposed so as to be concentric with the rotor axis 40. An encoder wheel 56, designed as an impeller, of a sensor 58 is co-rotationally fastened to the rotor axis 32, whereby the five blades are designed to be partially magnetic.

During operation, the blades of the encoder wheel 56 are moved along an annular circuit board 60 which is disposed perpendicularly to the rotor axis 40 and has two sinusoidal conductor paths that are embedded in a glass fiber-reinforced epoxy resin. The conductor paths 62 run about the rotor axis 40 and for signaling are connected to an evaluation unit 64 which is likewise at least in part formed by means of the circuit board 60. During operation, electric voltages are induced in the conductor paths 62 by means of the encoder wheel 56, said conductor paths 62 thus serving as conductors. These induced voltages are evaluated by means of the evaluation unit 64, and the rotating speed of the encoder wheel 56 and thus of the rotor shaft 42 is determined therefrom. Consequently, the sensor 8 is a rotating speed sensor, and the sensor 58 has a plurality of components, specifically at least the encoder wheel 56 and the circuit board 60. The circuit board 60, thus also the sensor 58, is fastened to a sensor support 66 which in turn is fastened to the bearing shield 44.

Figure 6:
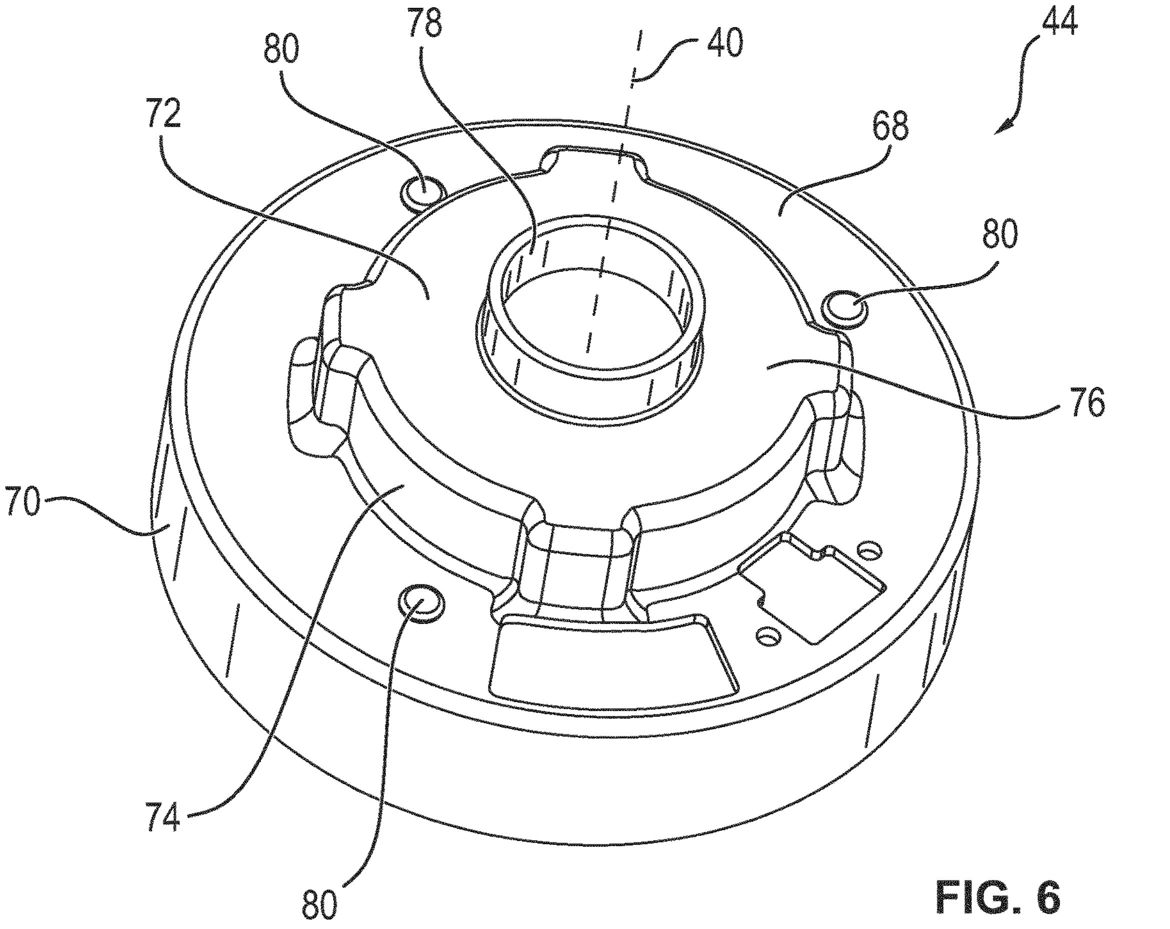
FIG. 6 shows a perspective fragmented view of the bearing shield.
Figure 7:
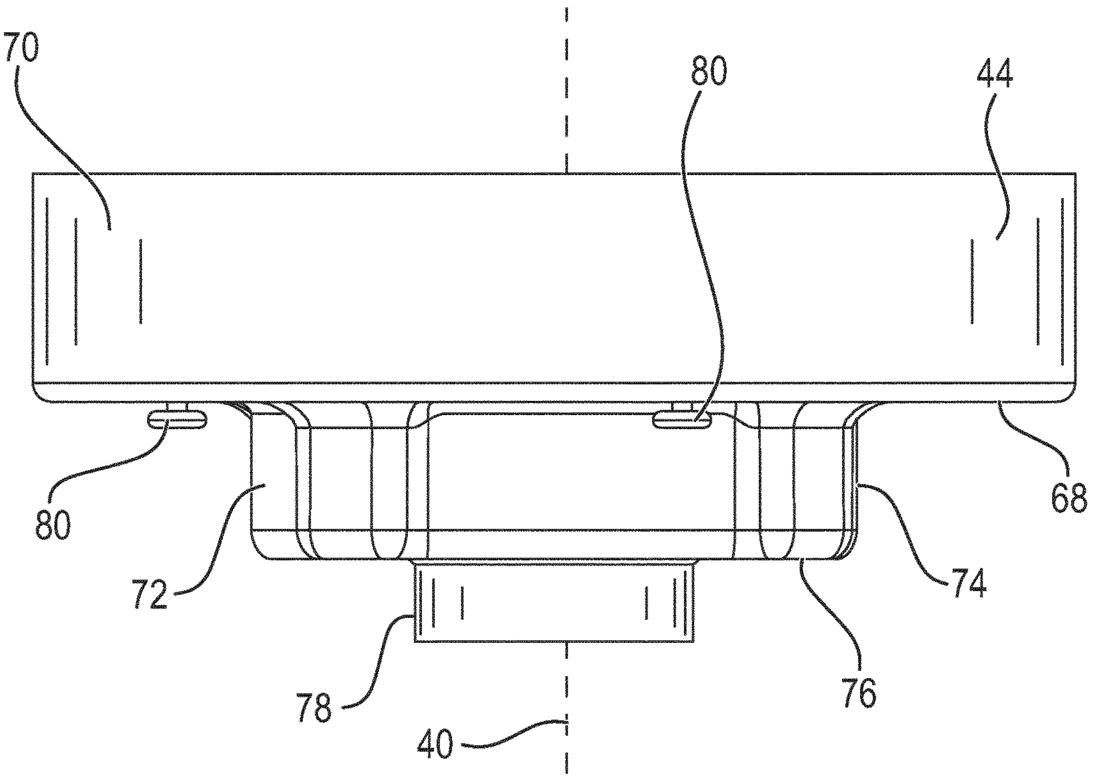
FIG. 7 shows a lateral view of the bearing shield.

The bearing shield 44 is illustrated in a perspective view in FIG. 6, and in a lateral view in FIG. 7. In the assembled state, the bearing shield 44 is disposed concentrically with the rotor axis 44. The bearing shield has an annularly designed periphery 68 which is disposed perpendicularly to the rotor axis 40 and which on its radially outer side is adjoined by a collar 70 of hollow-cylindrical design, the latter in the assembled state resting on the internal side of the motor housing 34. A pot-shaped elevation 72 which has a hollow-cylindrical portion 74 that is contiguous to the periphery 68 adjoins the periphery 68 on the radially inner side relative to the rotor axis 40. The hollow-cylindrical portion 74 herein is disposed along the rotor axis 40 and points in the direction opposite the collar 70.

The elevation 72 moreover comprises a base 76 which is disposed perpendicularly to the rotor axis 40 and is of an annular design, and by means of which the hollow-cylindrical portion 74 is closed off at the end side. Due to the hollow-cylindrical portion 74, the base 76 is offset relative to the periphery 68 along the rotor axis 40, specifically in the direction of the further bearing 49. A further collar 78 of hollow-cylindrical design, which likewise runs along the rotor axis 40 and in the assembled state receives the bearing 76, adjoins the radially inner side of the base 76. Furthermore, three rivets 80, which are mutually offset by an angle between 100° and 180° relative to the rotor axis 40, are integrally molded on the periphery 68. The rivets 80 herein run substantially parallel to the rotor axis 40 and are located on that side of the periphery 68 that faces the elevation 72.

Figure 8:
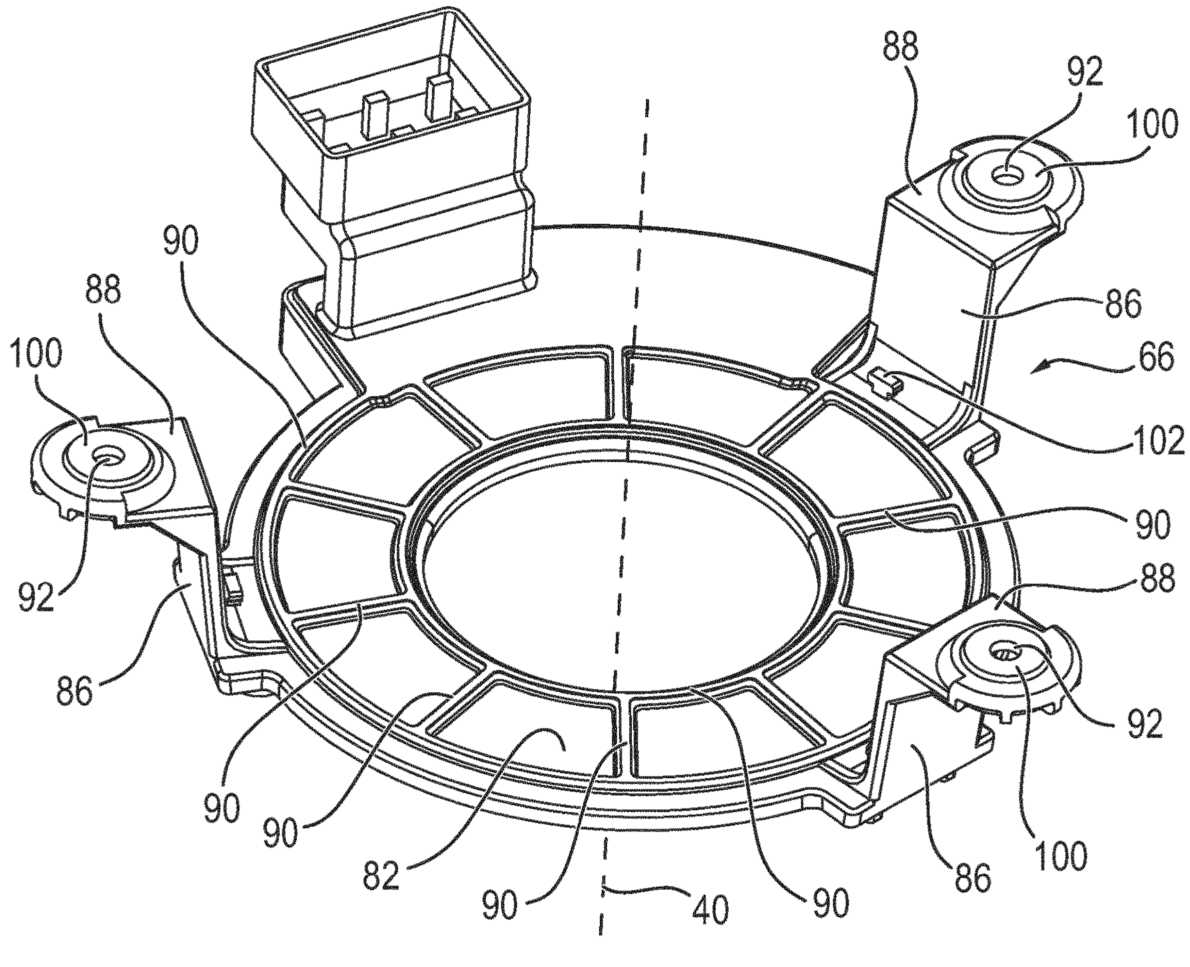
FIGS. 8, 9 show in each case the sensor support in different perspectives.
Figure 9:
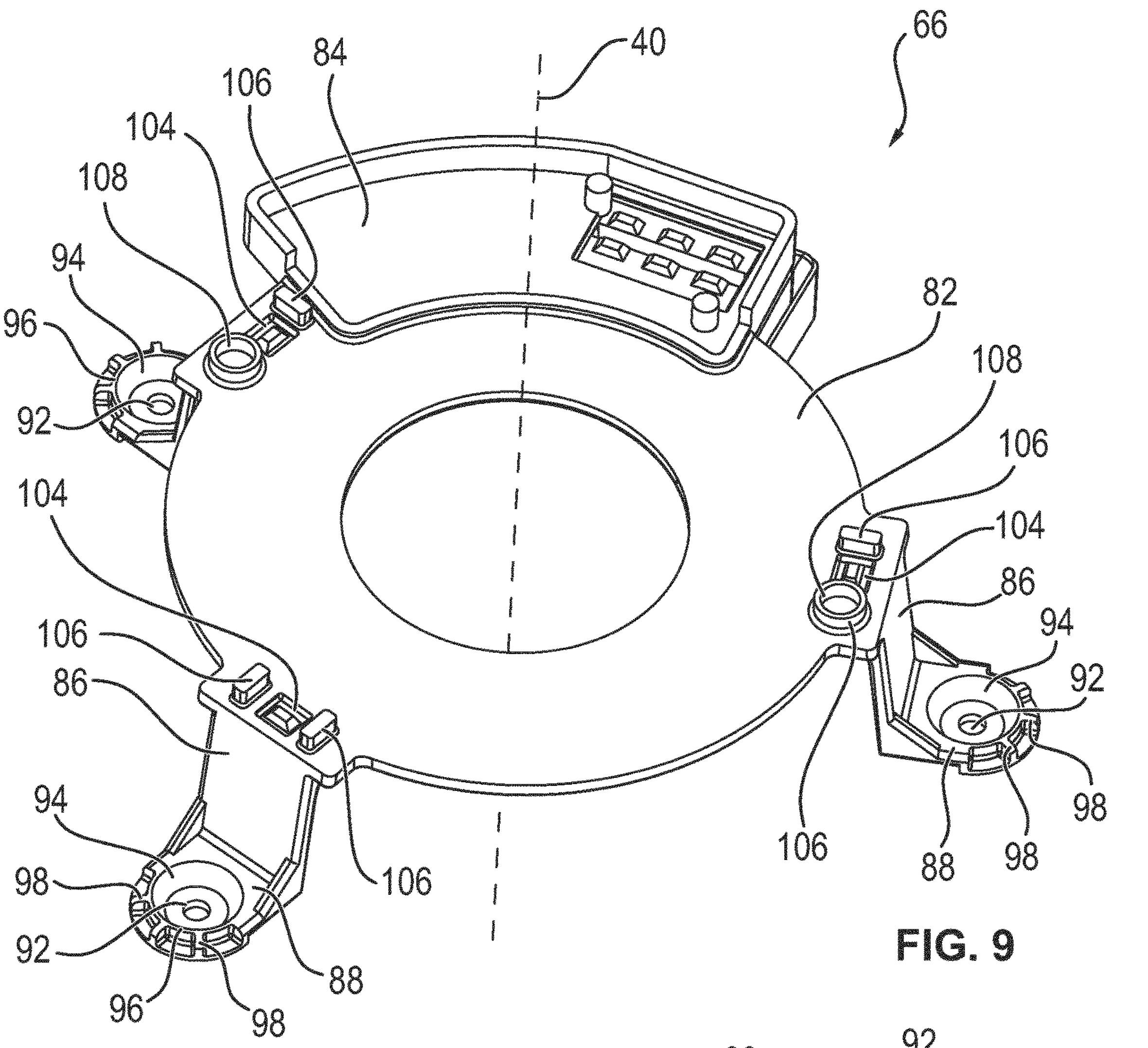
Figure 10:
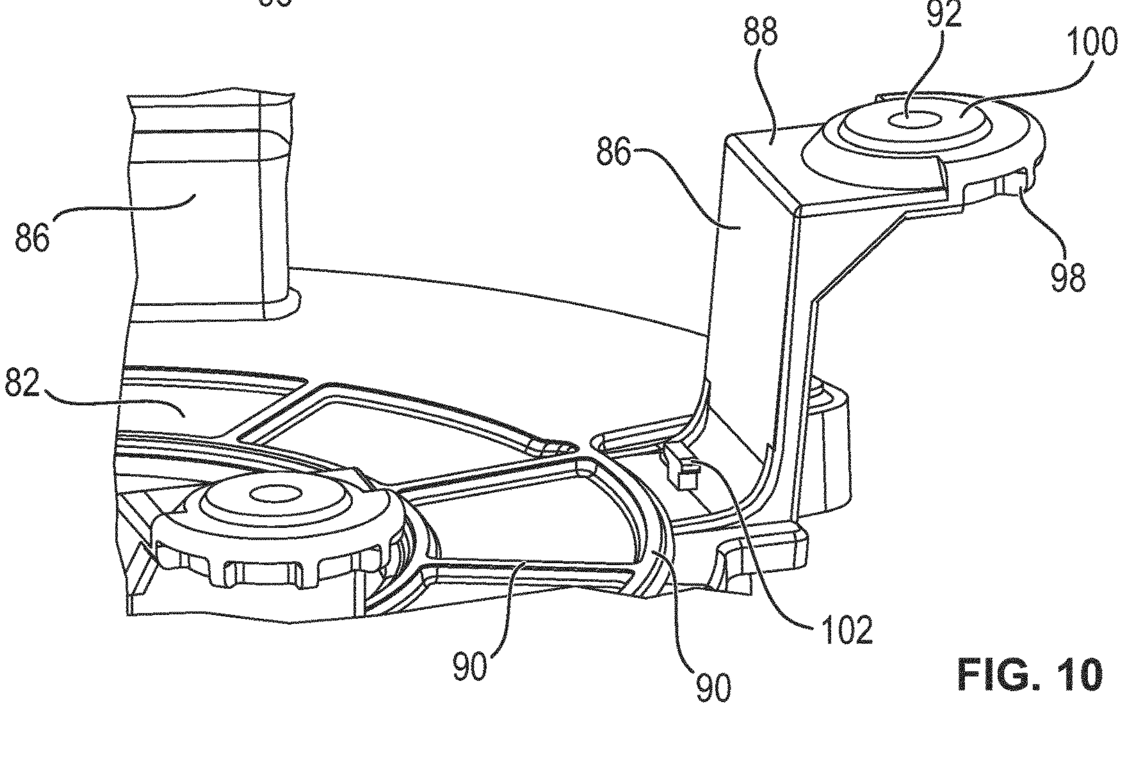
FIG. 10 shows a perspective view of an arm and of a tab of the sensor support.

The sensor support 66, which is made integrally of a plastics material by a plastic injection-molding method, is in each case illustrated when viewed from different perspectives in FIGS. 8 and 9, and enlarged in fragments in FIG. 10. The sensor support 66 has a flat annular body 82 which is disposed perpendicularly to the rotor axis 40 and on which an arcuate receptacle compartment 84 is integrally molded on the external side, the evaluation unit 64 being received in the assembled state by means of said receptacle compartment 84. Three arms 86 which in part run parallel to the rotor axis 40 and on the end lying opposite the body 82, thus on the end side, for forming a respective tab 88 are angled radially outward, thus away from the rotor axis 40, by 90°, are attached peripherally to the body 82, specifically on the radially outer periphery relative to the rotor axis 40. Consequently, the tabs 88 are disposed perpendicularly to the rotor axis 40 and, with the exception of the tab 88, the arms 86 run parallel to the rotor axis 40. The length of the arms 68 in a direction parallel to the rotor axis 40 is less than 5 cm, but greater than 1 cm.

Webs 90, which project parallel to the rotor axis 40 and are connected to one another, are integrally molded proximal to the arms 86 on the body 82. Two of the webs 90 are annular and disposed concentrically with the rotor axis 40, and are assigned to mutually opposite peripheries of the body 82. These two rings are connected to one another by means of the remaining webs 90.

Figure 11:
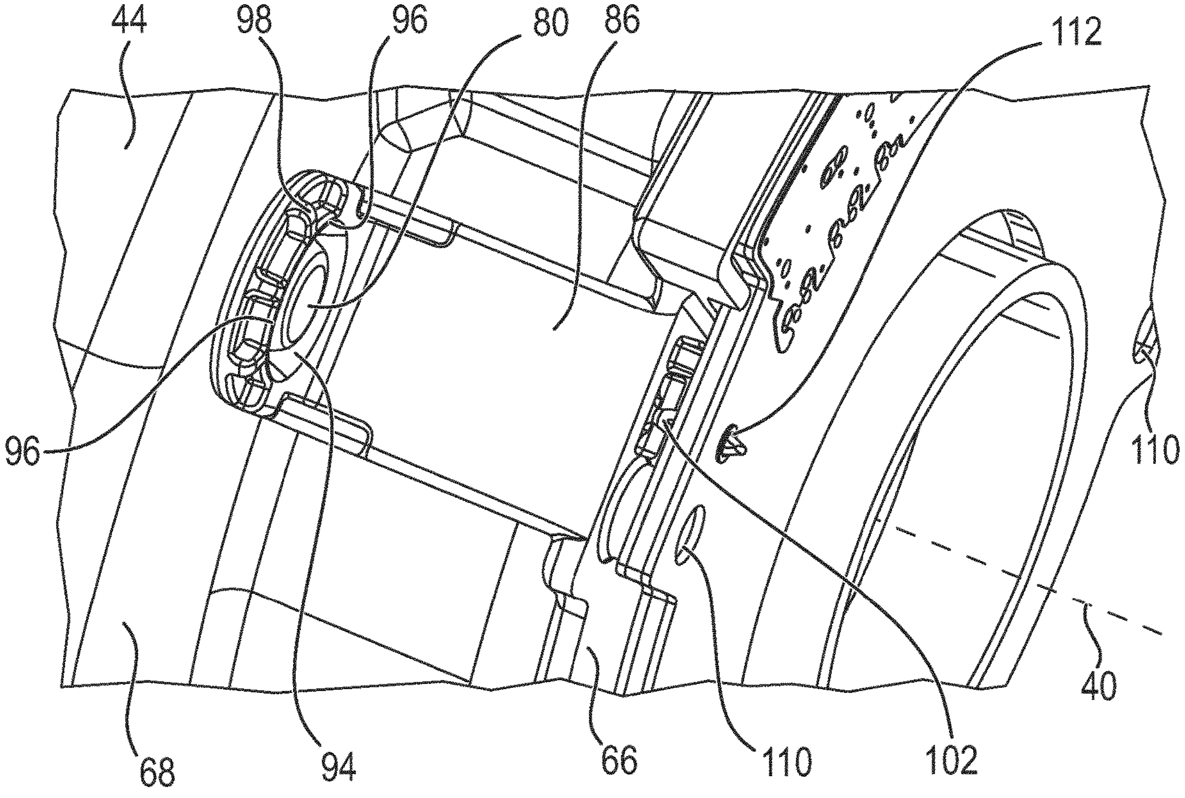
FIG. 11 shows an enlarged fragmented view of the sensor support fastened to the bearing shield, a sensor being fastened to said sensor support.
Figure 12:
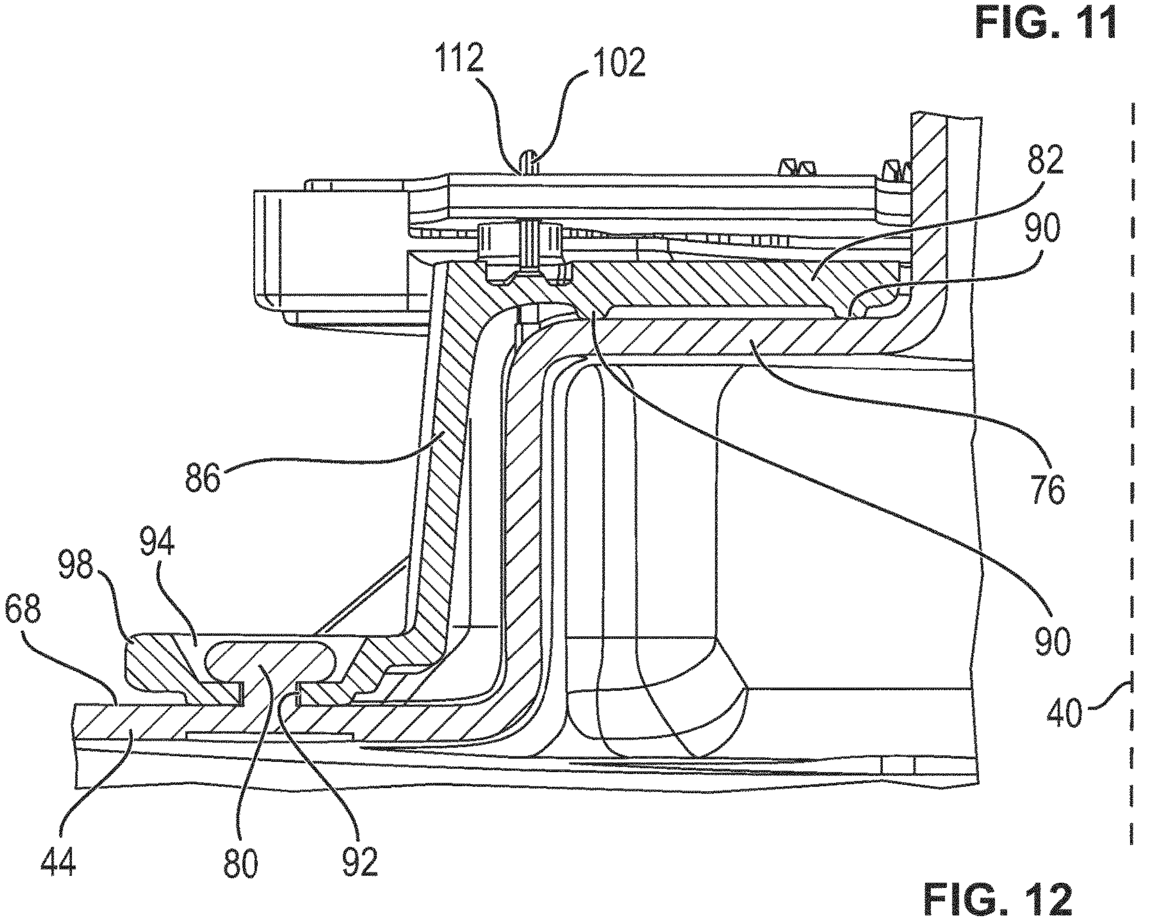
FIG. 12 shows the arrangement according to FIG. 11 in a sectional illustration.

Each of the tabs 88 has a through-opening 92 within which one of the rivets 80 is in each case disposed in the assembled state of the sensor support 66 on the bearing shield 44, said rivets 80 thus functioning as fastening means, as is shown in a perspective fragmented view in FIG. 11, and in a sectional fragmented view in FIG. 12. Consequently, the arms 86 are fastened to the bearing shield 44, specifically the periphery 68. The rivets 80, which penetrate in each case one of the through-openings 92, are each designed as a wobble rivet and subsequently generated by wobbling. Prior to wobbling, each of the rivets 80 is formed only by means of a cylindrical rod which is integrally molded on the periphery 68 and for assembling is guided through the respective through-opening 92 and subsequently enlarged on the end side by wobbling.

In order to facilitate the forming of the head of each rivet 80 generated in this way, each through-opening 92 is surrounded by a funnel-shaped receptacle 94 of the respective tab 88, for which purpose the tab 88 is partially depressed and bulged outward. The funnel-shaped receptacles 94 herein are located on the side that faces away from the periphery 68. Each funnel-shaped receptacle 94 on the periphery facing away from the body 82 is laterally delimited by an arcuate flange 96 which projects parallel to the rotor axis 40. In this way, each of the through-openings 92 on the side facing away from the bearing shield 44 is partially surrounded by the respective flange 96 projecting parallel to the rotor axis 40. Ribs 98 which run radially relative to the respective through-opening 92, and by way of which the respective flange 96 is stabilized, are integrally molded on each flange 96. A comparatively high mechanical stability is provided by virtue of a design embodiment of this type, so that comparatively high forces can also be exerted during wobbling without resulting in damage to the sensor support 66.

A ring 100, which is disposed concentrically with the respective through-opening 92 and in the assembled state rests on the periphery 68 of the bearing shield 44, is integrally molded on that side of each tab 88 that faces the bearing shield 44, specifically the periphery 68. A contact face is reduced in this way, which is why the sensor support 66, which has the total of three arms 86 and consequently three tabs 88, sits on the periphery 68 in a comparatively stable manner.

In the assembled state, the arms 86 rest circumferentially on the hollow-cylindrical portion 76 and thus encompass the latter. Consequently, it is avoided that the body 82 is offset perpendicularly to the rotor axis 40, even when the electric motor 32 is subjected to shock. Moreover, the body 82 is supported on the base 76 via the webs 90, the latter thus resting on the base 76. Consequently, the position of the body 82 of the sensor support 66, and also the alignment of the latter, is defined by means of the base 76, whereby comparatively stable resting on and contacting of the base 76 is implemented by virtue of the webs 90, even in the case of a slight distortion of the body 82. The arms 86 herein are designed in such a manner that the arms 86 are under tensile stress when wobbling the rivets 80, so that the webs 90 and consequently also the body 82 are pressed against the base 76 in such a way that a form-fitting contact takes place. Consequently, it is possible to manufacture the sensor support 66 with comparatively high manufacturing tolerances, whereby the position of the body 82 is always the same because said position is defined by means of the base 76 of the bearing shield 44.

Figure 13:
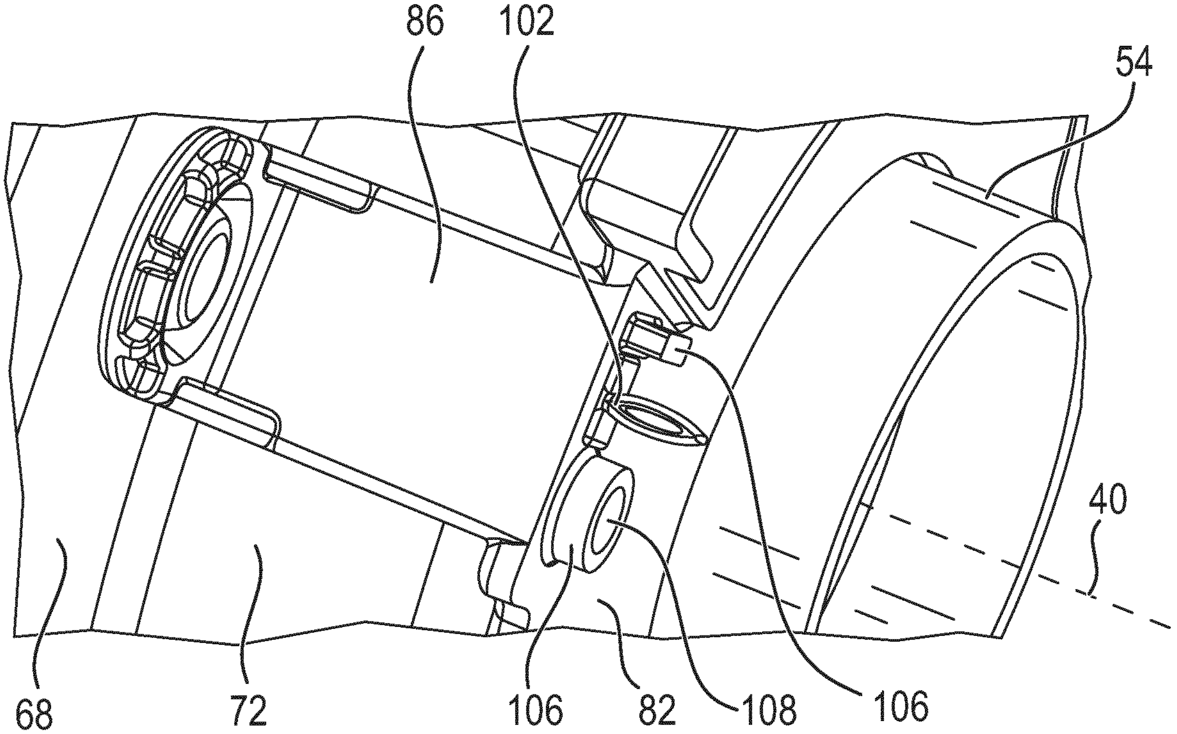
FIG. 13 shows an enlarged fragmented view of the sensor support according to FIG. 11 fastened to the bearing shield, wherein the sensor is omitted.
Figure 14:
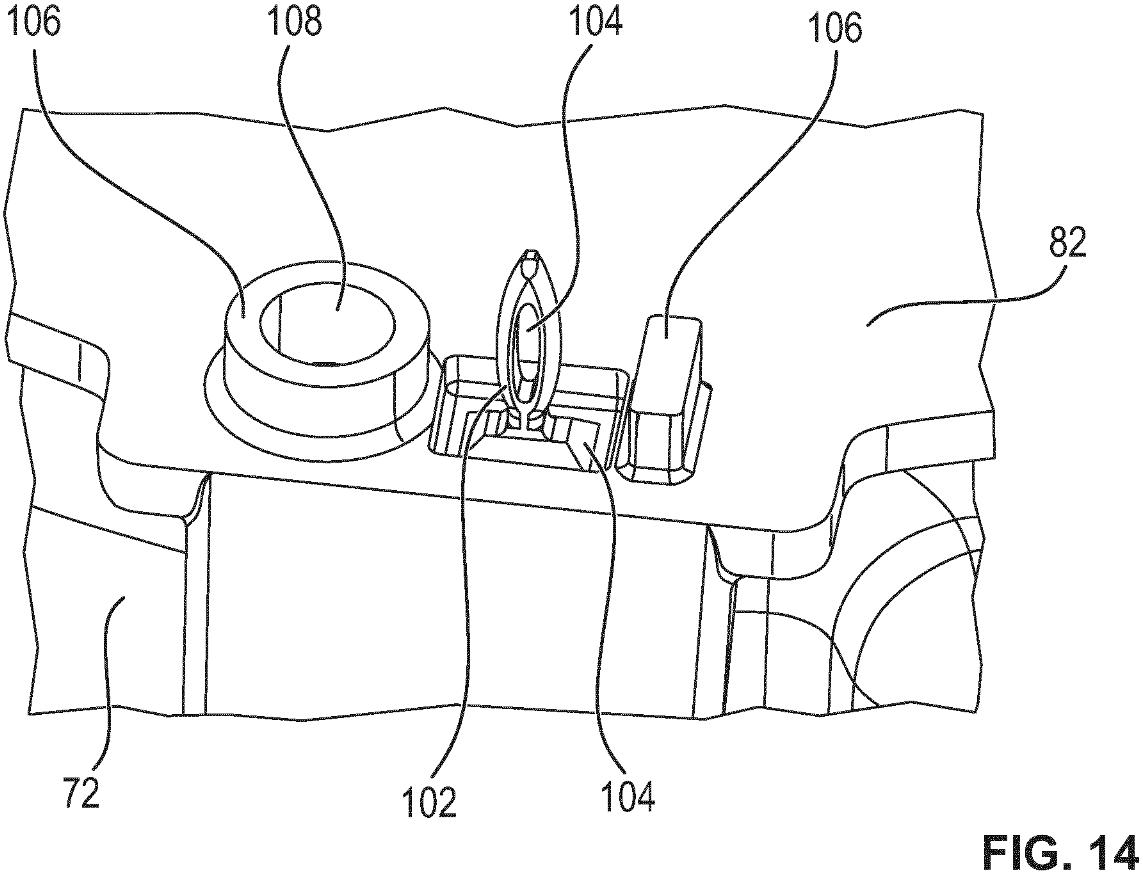
FIG. 14 shows a contact pin which is partially embedded in the sensor support.

Three contact pins 102 which protrude through the body 82 are partially embedded in the body 82, as is illustrated in a perspective view in FIGS. 13 and 14. The contact pins 102 are disposed parallel to the rotor axis 40, and each of the contact pins 102 is in each case located above one of the arms 86. In other words, in a direction parallel to the rotor axis 40, each of the contact pins 102 is disposed in the extension to a respective one of the arms 86.

The contact pins 102 are of identical construction and made of a spring steel. Each contact pin 102, on the side facing away from the bearing shield 44, has a needle eye-type opening 104 which is disposed outside the body and by means of which a press-fitting zone is determined. Consequently, the contact pins 102 are designed by press-fitting technology. In other words, the contact pins 102 are so-called press-fits.

Each of the contact pins 102 is surrounded by a rectangular depression 104 of the body 82. The depressions 104 point away from the base 76 as well as the periphery 68. The depressions 104 are in each case formed by means of a slide that holds the respective contact pin 102 during the plastic injection-molding process of the sensor support 44, so that the position of the contact pins 104 is determined in a comparatively precise manner.

In a tangential direction relative to the rotor axis 40, each of the contact pins 102, and consequently also each of the depressions 104, is in each case surrounded by a dome 106 running parallel to the rotor axis 40, said domes 106 being in each case contiguous to the depression 104 or at least being located at a comparatively minor spacing from the latter, specifically by at most 5 mm.

Two of the domes 106 which are assigned to different contact pins 102 are of a hollow-cylindrical design and therefore have an opening 108 in the manner of a blind bore. The remaining domes 106 have an elongate rectangular cross section perpendicular to the rotor axis 40.

For assembling the electric motor 32, the sensor support 66 is first produced by means of plastic injection-molding, whereby the contact pins 102 are embedded into the body 82 in such a way that it is impossible for the contact pins 102 to be released from the sensor support 66 in a non-destructive manner. The sensor support 66 is subsequently fastened to the bearing shield 44 in the manner described above, whereby the sensor support 66 is placed onto the pot-shaped elevation 72 in such a way that the annular body 82 circumferentially surrounds the further collar 78. The wobbling of the rivets 80 is facilitated due to the arrangement of the tabs 88. Moreover, with the exception of the contact pins 102, there are substantially no delicate components so that engaging on the sensor support 66 for aligning and holding for assembling purposes is simplified. It is possible to engage on the body 32 in the process, and to thus align and suitably position the sensor support 66 relative to the bearing shield 44.

Thereafter, the sensor 58, specifically the circuit board 60, is fastened to the sensor support 66. For this purpose, one pin, which runs parallel to the rotor axis 40, is in each case inserted in each of the openings 108 of the two domes 106, while forming a clearance fit. The circuit board 60, which for this purpose has two assembly holes 110 through which the pins are guided, is placed onto the two pins. A clearance fit is likewise established between the assembly holes 110 and the respectively assigned pin, so that the circuit board 60 is aligned perpendicularly to the rotor axis 40. Moving the circuit board 60 parallel to the rotor axis 40 along the pins is also possible.

The circuit board 60 has three fastening holes 112, each of which is assigned to one of the contact pins 102, the latter plunging into these fastening holes 112 when the circuit board 60 is moved close to the body 82. In other words, each of the contact pins 102 is guided through the respectively assigned fastening hole 112. The circuit board 60 is moved along the rotor axis 40 until said circuit board 60 rests on the ends of the domes 106 of identical height that face away from the body 82, thus on the end sides of said domes 106, the latter thus being attached to the body 82 so as to point in the direction of the circuit board 60. An introduction of the contact pins 102 into the fastening holes 112 is thus delimited by means of the domes 106.

In the process, the needle eye-type opening 104 of each contact pin 102, which in this region has a larger extent perpendicular to the rotor axis 40 than the respectively assigned fastening hole 112, comes to lie in the respectively assigned fastening hole 112. The needle eye-type opening 104 of each contact pin 112 is elastically deformed as a result. Therefore, a force between the fastening holes 112 and the contact pins 102 acts in such a way that releasing the circuit board 60 from the sensor support 66 is only possible by means of applying a force. If an offset is prevalent when introducing the contact pins 102 into the respectively assigned fastening holes 112, bending of the contact pins 102 to a certain degree is possible due to the depressions 104, the latter thus being disposed on that side of the body 82 that faces the circuit board 60. Bending herein takes place in a predetermined manner and is defined by means of the two pins.

Subsequently, the two pins which are used for positioning the circuit board 60 are removed from the opening 108 of the domes 106 as well as from the assembly holes 110 of the circuit board 60. Owing to the clearance fit of the pins between the openings 108 as well as the assembly face 110, the two openings 108 of the domes 106 that point toward the circuit board 60 are thus disposed so as to be co-aligned with the respectively assigned assembly hole 110.

With the exception of the mechanical fastening of the circuit board 60 to the sensor support 66, the contact pins 102 do not have any further function. However, the assembling of the circuit board 60 after the fastening of the sensor support 66 to the bearing shield 44 is made possible in this way without the aid of further fastening means or tools, with the exception of the pins by means of which the correct positioning is performed, and the production of a stable connection is thus enabled. Due to the arms 86, the circuit board 60, and consequently also the conductor path 62, is spaced apart from the periphery 68 as well as from the rivets 80 in such a way that the exact shape of the respective rivets 80 does not have any influence on the functioning of the sensor 58. In other words, the functional mode of the sensor 58 is not compromised by the rivets 80, which is why robustness during operation is increased.

The invention is not limited to the exemplary embodiment described above. Instead, other variants of the invention may also be derived therefrom by a person skilled in the art without departing from the subject matter of the invention. All of the individual features described in connection with the individual exemplary embodiments are furthermore in particular also able to be combined with one another in other ways without departing from the subject matter of the invention.

LIST OF REFERENCE SIGNS

2 Motor vehicle
4 Wheel
6 Brake
8 Brake disk
10 Brake caliper
12 Brake fluid system
14 Compensation vessel
16 Ancillary unit
18 Foot pedal
20 Pump chamber
22 Working piston
24 Connecting rod

26 Input rod
28 Drive pinion
30 Gearbox
32 Electric motor
34 Motor housing
36 Stator
38 Rotor
40 Rotor axis
42 Rotor shaft
44 Bearing shield
46 Bearing
48 Further bearing shield
49 Further bearing
50 Gear wheel
52 Further sensor
54 Receptacle
56 Encoder wheel
58 Sensor
60 Circuit board
62 Conductor path
64 Evaluation unit
66 Sensor support
68 Periphery
70 Collar
72 Elevation
74 Hollow-cylindrical portion
76 Base
78 Further collar
80 Rivet
82 Body
84 Receptacle compartment
86 Arm
88 Tab
90 Web
92 Through-opening
94 Funnel-shaped receptacle
96 Flange
98 Rib
100 Ring
102 Contact pin
104 Needle eye-type opening
106 Dome
108 Opening
110 Assembly hole
112 Fastening hole

The invention claimed is:

1. An electric motor for an ancillary unit of a motor vehicle, the electric motor comprising:

a sensor having a plurality of fastening holes formed therein;

a sensor support made of a plastics material and having a body on which said sensor being held; and a plurality of contact pins embedded in said body by press-fitting technology, said contact pins being in each case guided through one corresponding one of said fastening holes of said sensor, wherein said contact pins each have a needle eye-type opening formed therein and lies in a respectively assigned one of said fastening holes and is elastically deformed.

2. The electric motor according to claim 1, wherein said sensor has a circuit board in which said fastening holes are formed.

3. The electric motor according to claim 1, wherein:

said body has a plurality of depressions formed therein; and each of said contact pins on that side facing said sensor is surrounded by one of said depressions of said body.

4. The electric motor according to claim 1, further comprising domes pointing in a direction of said sensor and being attached to said body, each of said domes having an end side and said sensor resting on said end side of said domes.

5. The electric motor according to claim 4, wherein:

said sensor has an assembly hole formed therein; and at least one of said domes has an opening formed therein which points toward said sensor and is co-aligned with an assigned said assembly hole of said sensor.

6. The electric motor according to claim 1, wherein the ancillary unit is an electromechanical brake booster.

7. An electric motor for an ancillary unit of a motor vehicle, the electric motor comprising:

a sensor having a plurality of fastening holes formed therein;

a bearing shield;

a sensor support made of a plastics material and having a body on which said sensor being held, wherein said body is disposed perpendicularly to a rotor axis and has arms attached peripherally to said body, said arms at least in part run parallel to the rotor axis and are fastened to said bearing shield; and a plurality of contact pins embedded in said body by press-fitting technology, said contact pins being in each case guided through one corresponding one of said fastening holes of said sensor.

8. The electric motor according to claim 7, wherein each of said contact pins is in each case disposed above one of said arms.

9. The electric motor according to claim 7, wherein said sensor has a circuit board in which said fastening holes are formed.

10. The electric motor according to claim 7, wherein said contact pins each have a needle eye-type opening formed therein and lies in a respectively assigned one of said fastening holes and is elastically deformed.

11. The electric motor according to claim 7, wherein:

said body has a plurality of depressions formed therein; and each of said contact pins on that side facing said sensor is surrounded by one of said depressions of said body.

12. The electric motor according to claim 7, further comprising domes pointing in a direction of said sensor and being attached to said body, each of said domes having an end side and said sensor resting on said end side of said domes.

13. The electric motor according to claim 12, wherein:

said sensor has an assembly hole formed therein; and at least one of said domes has an opening formed therein which points toward said sensor and is co-aligned with an assigned said assembly hole of said sensor.

14. The electric motor according to claim 7, wherein the ancillary unit is an electromechanical brake booster.

15. An ancillary unit of a motor vehicle, the ancillary unit comprising:

an electric motor, containing:

a sensor having a plurality of fastening holes formed therein;

a sensor support made of a plastics material and having a body on which said sensor is held; and a plurality of contact pins embedded in said body by press-fitting technology, said contact pins being in each case guided through one corresponding one of said fastening holes of said sensor, wherein said contact pins each have a needle eye-type opening formed therein and lies in a respectively assigned one of said fastening holes and is elastically deformed.

16. The ancillary unit according to claim 15, wherein the ancillary unit is an electromechanical brake booster.

* * * * *